United States Patent
Li et al.

(10) Patent No.: US 12,245,107 B2
(45) Date of Patent: Mar. 4, 2025

(54) COMMUNICATION APPARATUS AND METHOD OF V2X SERVICES AND COMMUNICATION SYSTEM

(71) Applicant: FUJITSU LIMITED, Kawasaki (JP)

(72) Inventors: Guorong Li, Beijing (CN); Meiyi Jia, Beijing (CN); Pengyu Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 357 days.

(21) Appl. No.: 17/725,661

(22) Filed: Apr. 21, 2022

(65) Prior Publication Data
US 2022/0256318 A1    Aug. 11, 2022

Related U.S. Application Data

(63) Continuation of application No. PCT/CN2019/115995, filed on Nov. 6, 2019.

(51) Int. Cl.
| | |
|---|---|
| *H04W 4/30* | (2018.01) |
| *H04W 4/12* | (2009.01) |
| *H04W 4/40* | (2018.01) |
| *H04W 76/18* | (2018.01) |
| *H04W 92/18* | (2009.01) |

(52) U.S. Cl.
CPC .............. *H04W 4/12* (2013.01); *H04W 4/40* (2018.02); *H04W 76/18* (2018.02); *H04W 92/18* (2013.01)

(58) Field of Classification Search
CPC ......... H04W 4/12; H04W 4/40; H04W 76/14; H04W 76/15; H04W 76/18; H04W 76/19; H04W 76/30; H04W 92/18
See application file for complete search history.

(56) References Cited

U.S. PATENT DOCUMENTS

| | | | | |
|---|---|---|---|---|
| 11,206,558 | B2* | 12/2021 | Jung | ............... H04W 24/04 |
| 11,758,590 | B2* | 9/2023 | Pan | ................ H04W 76/10 |
| | | | | 370/329 |
| 2013/0182555 | A1 | 7/2013 | Raaf et al. | |
| 2017/0215119 | A1 | 7/2017 | Hong et al. | |

(Continued)

FOREIGN PATENT DOCUMENTS

| | | |
|---|---|---|
| CN | 106658352 A | 5/2017 |
| CN | 106797534 A | 5/2017 |

(Continued)

OTHER PUBLICATIONS

International Search Report and Written Opinion of the International Searching Authority issued by the China National Intellectual Property Administration for corresponding International patent application No. PCT/CN2019/115995 on Jul. 22, 2020, with partial English translation.

(Continued)

*Primary Examiner* — Frank Duong
(74) *Attorney, Agent, or Firm* — Myers Wolin, LLC

(57) ABSTRACT

This disclosure provides a communication apparatus and method of vehicle communication (V2X) services and a communication system. The apparatus includes a first communication portion, the first communication portion being configured to: detect that a radio link failure occurs in a sidelink; and notify that radio link failures occur in all sidelinks of the terminal equipment to a network device via a Sidelink UE Information message.

14 Claims, 15 Drawing Sheets

(56) References Cited

U.S. PATENT DOCUMENTS

| | | | |
|---|---|---|---|
| 2017/0265243 | A1 | 9/2017 | Hahn et al. |
| 2018/0167988 | A1 | 6/2018 | Jung et al. |
| 2018/0317066 | A1 | 11/2018 | Xu et al. |
| 2018/0368175 | A1 | 12/2018 | Jeon et al. |
| 2019/0246442 | A1 | 8/2019 | Park et al. |
| 2019/0387446 | A1 | 12/2019 | Xu et al. |
| 2021/0045178 | A1* | 2/2021 | Kung .............. H04W 76/18 |
| 2021/0068187 | A1* | 3/2021 | Baghel ............ H04W 76/19 |
| 2021/0392533 | A1 | 12/2021 | Wang |
| 2022/0117032 | A1* | 4/2022 | Han .............. H04L 1/08 |
| 2022/0201790 | A1* | 6/2022 | Jung .............. H04W 76/20 |
| 2022/0279617 | A1* | 9/2022 | Orsino ............ H04W 76/15 |

FOREIGN PATENT DOCUMENTS

| | | |
|---|---|---|
| CN | 107889080 A | 4/2018 |
| CN | 109417695 A | 3/2019 |
| CN | 110177353 A | 8/2019 |
| JP | 2021-72629 | 5/2021 |
| WO | 2017/0133592 A1 | 8/2017 |
| WO | 2018/084590 A1 | 5/2018 |
| WO | 2018/129875 A1 | 7/2018 |
| WO | 2018196497 A1 | 11/2018 |

OTHER PUBLICATIONS

First Notification of Office Action and Search Report issued by the China National Intellectual Property Administration for corresponding Chinese Patent Application No. 201980101644.0, mailed on Mar. 29, 2024, with an English translation.

LG Electronics, Inc,, "[Running CR] Introduction of 5G V2X with NR Sidelink", Work Item Code: 5G_V2X_NRSL-Core, 3GPP TSG-RAN WG2 Meeting #107bis, R2-1914000, Change Request, 38.300 CR rev Current Version: 15.5.0, Chongqing, China, Oct. 14-18, 2019.

Notice of Reasons for Refusal issued by the Japan Patent Office for corresponding Japanese Patent Application No. 2022-525174, mailed on Jun. 6, 2023, with an English translation.

RAN2, "LS on SL RLF handing", Work Item: 5G_V2X_NRSL-Core, 3GPP TSG-RAN WG2 Meeting #107bis, R2-1914149, Chongqing, P.R. China, Oct. 14-18, 2019.

OPPO, "Miscellaneous issues on PC5-RRC", Agenda Item: 6.4.5, 3GPP TSG-RAN WG2 Meeting #107bis, R2-1912078, Chongqing, China, Oct. 14-18, 2019.

TD Tech, "Carrier resource control of MC-HSUPA for 1.28Mcps TDD", Agenda Item: 11.1.5, 3GPP TSG-RAN WG2 Meeting #69, R2-101137, San Francisco, USA, Feb. 22-26, 2010.

Second Notification of Office Action issued by the China National Intellectual Property Administration for corresponding Chinese Patent Application No. 201980101644.0, mailed on Aug. 27, 2024, with an English translation.

Huawei et al., "Considerations on RRM and RLM for NR V2X unicast", Agenda Item: 11.4.2.1, 3GPP TSG-RAN WG2 Meeting #105, R2-1902038, Athens, Greece, Feb. 25-Mar. 1, 2019.

* cited by examiner

501 the network device receives, via a Sidelink UE Information message, that radio link failures occur in all sidelinks of a terminal equipment notified by the terminal equipment

1101 in a case where radio link failures occur, the network device receives destination IDs where radio link failures occur from a terminal equipment, or receives remaining destination IDs other than destination IDs where radio link failures occur from a terminal equipment, according to a resource allocation mode to which the terminal equipment corresponds

FIG. 11

1201 the terminal equipment receives a radio resource control message transmitted by a network device, the radio resource control message being used for configuring a first index for destination IDs in a Sidelink UE Information message that has been transmitted by the terminal equipment

1202 the terminal equipment transmits the Sidelink UE Information message containing the first index to which the destination IDs correspond

FIG. 12

1701 a Sidelink UE Information message is received from a terminal equipment, wherein in a case where a cast type (CastType) and/or quality of service (QoS) to which destination IDs in the Sidelink UE Information message correspond is/are not changed, a field used for indicating the cast type to which the destination IDs correspond and/or a field used for indicating the quality of service to which the destination IDs correspond do(es) not appear in the Sidelink UE Information message

FIG. 17

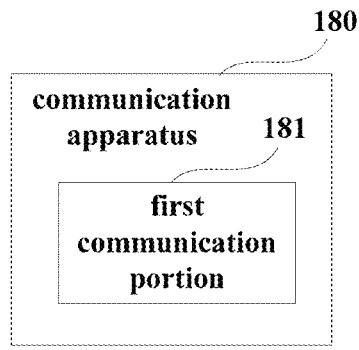

FIG. 18

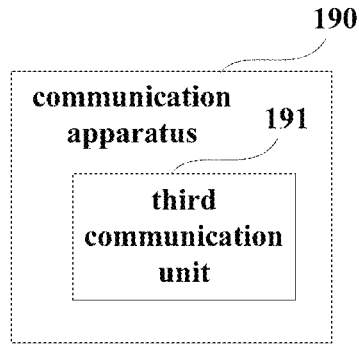

FIG. 19

COMMUNICATION APPARATUS AND METHOD OF V2X SERVICES AND COMMUNICATION SYSTEM

CROSS-REFERENCE TO RELATED APPLICATION

This application is a continuation application of International Application PCT/CN2019/115995 filed on Nov. 6, 2019 and designated the U.S., the entire contents of which are incorporated herein by reference.

TECHNICAL FIELD

This disclosure relates to the field of communications.

BACKGROUND

Vehicle communication services are denoted by V2X services. V2X services may include multiple types, such as Vehicle-to-Vehicle (V2V) communication services, Vehicle-to-Infrastructure (V2I) communication services, and Vehicle-to-Pedestrian (V2P) communication services.

V2X services may be provided via a PC5 interface and/or a Uu interface. V2X services transmitted via a PC5 interface may be provided by V2X sidelink communication. The V2X sidelink communication is a communication mode in which terminal equipments may directly communicate with each other via a PC5 interface.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

In the related art, for a unicast link, radio link monitoring (RLM) on a PC5 interface (also referred to as a sidelink) is supported, and whether a radio link failure (RLF) occurs on the sidelink may be detected by performing radio link monitoring on the sidelink.

It was found by the inventors of this disclosure that in the related art, when radio link failures occur in all sidelinks of a terminal equipment, how to notify a network device in a manner of occupying relatively few radio resources is a problem that needs to be solved.

Embodiments of this disclosure provide a communication apparatus and method of V2X services and a communication system. In the method, a terminal equipment notifies that radio link failures occur in all sidelinks of the terminal equipment to a network device via a Sidelink UE Information (SUI) message. Hence, that radio link failures occur in all sidelinks of the terminal equipment may be notified to the network device in a manner of occupying relatively few radio resources.

According to a first aspect of the embodiments of this disclosure, there is provided a communication apparatus of V2X services, applicable to a terminal equipment, the apparatus including a first communication portion, the first communication portion being configured to: detect that a radio link failure occurs in a sidelink; and notify that radio link failures occur in all sidelinks of the terminal equipment to a network device via a Sidelink UE Information message.

According to a second aspect of the embodiments of this disclosure, there is provided a communication apparatus of V2X services, applicable to a network device, the apparatus including a second communication portion, the second communication portion is configured to: receive, via a Sidelink UE Information message, that radio link failures occur in all sidelinks of a terminal equipment notified by the terminal equipment.

According to a third aspect of the embodiments of this disclosure, there is provided a communication system, including a terminal equipment and a network device, the terminal equipment including the communication apparatus as described in the first aspect of the embodiments, and the network device including the communication apparatus as described in the second aspect of the embodiments.

An advantage of the embodiments of this disclosure exists in that the terminal equipment notifies that radio link failures occur in all sidelinks of the terminal equipment to the network device via the Sidelink UE Information message. Hence, that radio link failures occur in all sidelinks of the terminal equipment may be notified to the network device in a manner of occupying relatively few radio resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 11 is a schematic diagram of the communication method of a sixth aspect of the embodiments of this disclosure;

FIG. 12 is a schematic diagram of the communication method of V2X services of a seventh aspect of the embodiments of this disclosure;

FIG. 17 is a schematic diagram of the communication method of a tenth aspect of the embodiments of this disclosure;

FIG. 18 is a schematic diagram of the communication apparatus of a twelfth aspect of the embodiments of this disclosure;

FIG. 19 is another schematic diagram of the communication apparatus of the twelfth aspect of the embodiments of this disclosure;

DETAILED DESCRIPTION OF THE DISCLOSURE

Figure 1:
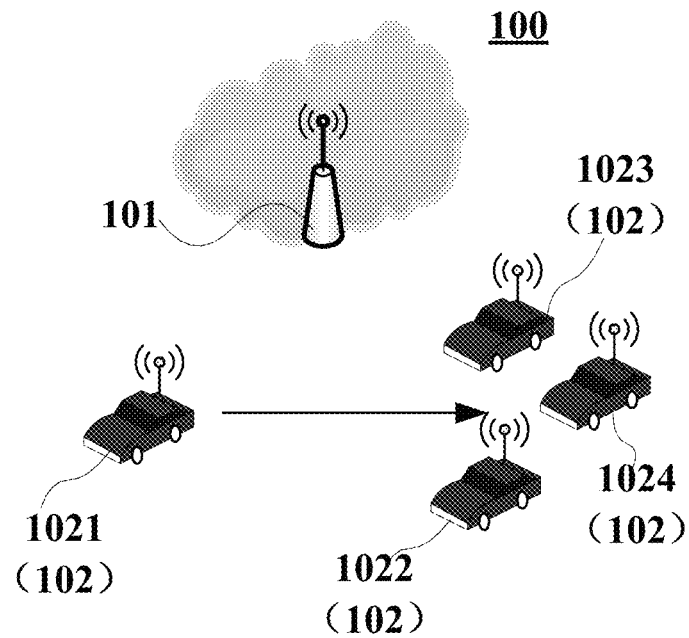
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and multiple terminal equipments 102, the multiple terminal equipments 102 being, for example, a terminal equipment 1021, a terminal equipment 1022, a terminal equipment 1023, and a terminal equipment 1024.

In the embodiment of this disclosure, existing traffics or traffics that may be implemented in the future may be performed between the network device 101 and the terminal equipments 102. For example, such traffics may include but not limited to enhanced mobile broadband (eMBB), massive machine type communication (MTC), and ultra-reliable and low-latency communication (URLLC).

The terminal equipments 102 may transmit data to the network device 101 and receive feedback information from the network device 101. The network device 101 may transmit data to one or more terminal equipments 102, and receive feedback transmitted by the terminal equipments 102.

Furthermore, the terminal equipments 102 may transmit information on V2X services to other one or more terminal equipments 102, or the terminal equipments 102 may receive information on V2X services from other terminal equipments 102, wherein the information on V2X services may be transmitted or received in a manner of unicast, groupcast, or broadcast. For example, the terminal equipment 1021 transmits information on V2X services to terminal equipment 1022, or the terminal equipment 1021 receives information on V2X services from terminal equipment 1022; for another example, the terminal equipment 1021 transmits information on V2X services to terminal equipment 1022, terminal equipment 1023 and terminal equipment 1024.

First Aspect of Embodiments

The embodiment of the first aspect of this disclosure provides a communication method, which may be executed by a terminal equipment, such as the terminal equipment 1021 shown in FIG. 1.

Figure 2:
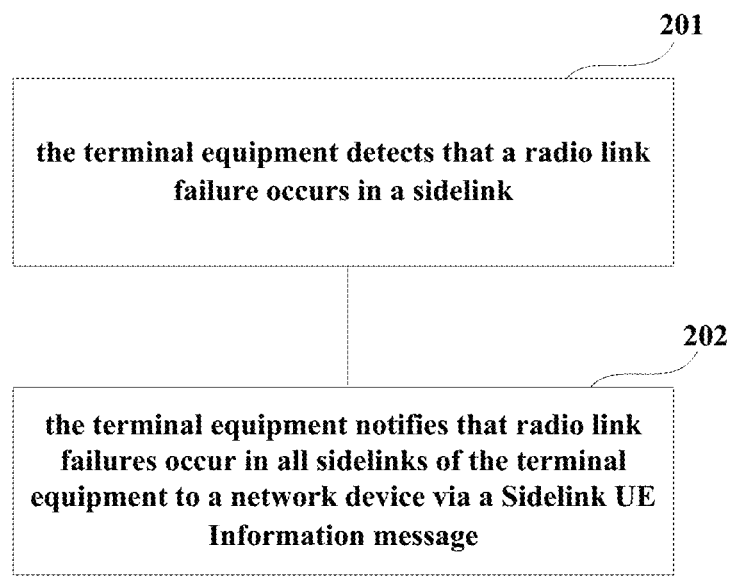
FIG. 2 is a schematic diagram of the communication method of V2X services of a first aspect of the embodiments of this disclosure.

FIG. 2 is a schematic diagram of the communication method of vehicle communication (V2X) services of the first aspect of the embodiments of this disclosure. As shown in FIG. 2, the method includes:

operation 201: the terminal equipment detects that a radio link failure occurs in a sidelink; and operation 202: the terminal equipment notifies that radio link failures occur in all sidelinks of the terminal equipment to a network device via a Sidelink UE Information message.

According to the embodiment of the first aspect of this disclosure, the terminal equipment notifies that radio link failures occur in all sidelinks of the terminal equipment to the network device via the Sidelink UE Information message. Hence, that radio link failures occur in all sidelinks of the terminal equipment may be notified to the network device in a manner of occupying relatively few radio resources.

Figure 3:
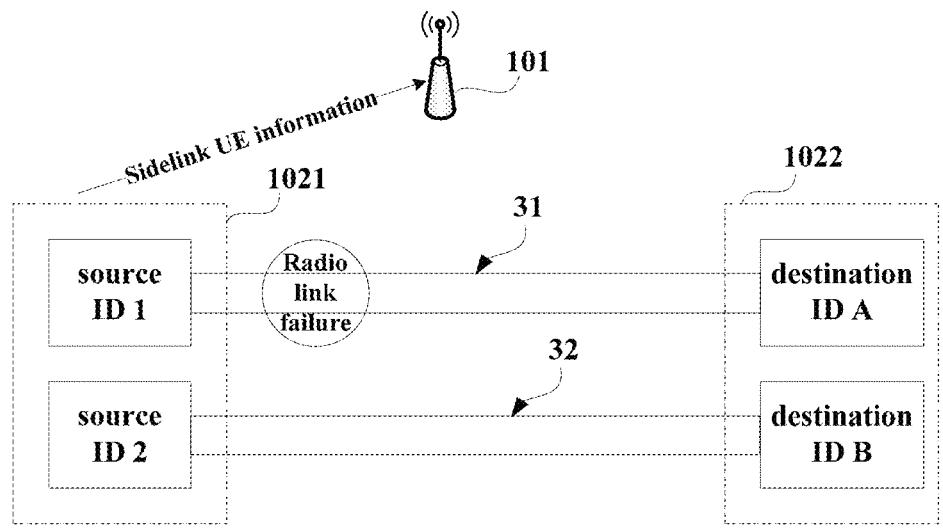
FIG. 3 is a schematic diagram of occurrence of a radio link failure in a sidelink between terminal equipments.

FIG. 3 is a schematic diagram of occurrence of a radio link failure in a sidelink between terminal equipments. As shown in FIG. 3, sidelink communication is performed between the terminal equipment 1021 and the terminal equipment 1022, and there may exist multiple logic connections between the terminal equipment 1021 and the terminal equipment 1022, and each logic connection is, for example, PC5-RRC connection or a PC5 unicast link.

Each logic connection is identified by a pair of source ID and destination ID. For example, logic connection 31 is identified by source ID 1 in the terminal equipment 1021 and destination ID A in the terminal equipment 1022, logic connection 32 is identified by source ID 2 in the terminal equipment 1021 and destination ID B in the terminal equipment 1022, and logic connection 31 and logic connection 32 may be in a unicast communication mode, that is, data are transmitted from source IDs 1 and 2 to destination IDs A and B.

In FIG. 3, only a case where sidelink communication is performed between the terminal equipment 1021 and the terminal equipment 1022 is shown, and cases where communication is performed between the terminal equipment 1021 and other terminal equipments are similar to that in FIG. 3. In addition, FIG. 3 only shows a case where the number of logic connections is 2; however, the embodiment of this disclosure is not limited thereto, and the number of logic connections may be more than 3.

In this disclosure, as shown in FIG. 3, the terminal equipment 1021 may communicate with a network device 101; for example, the terminal equipment 1021 may transmit a Sidelink UE Information message to the network device 101, and the terminal equipment 1021 may receive configuration information and/or control information, etc., from the network device 101.

In operation 201 of FIG. 2, the terminal equipment 1021 may detect whether a radio link failure occurs in the sidelink. For example, the terminal equipment 1021 detects whether a radio link failure occurs in the logic connections 31 and 32.

In this disclosure, there exist correspondence relationships between the logic connections and the destination IDs, therefore, occurrence of a radio link failure in a logic connection may also be referred to as occurrence of a radio link failure in a destination ID or occurrence of a radio link failure in a sidelink to a destination ID. In the embodiments of this disclosure, meanings of these three expressions are identical.

In at least one embodiment, the terminal equipment 1021 may report to the network device 101 when occurrence of a radio link failure is detected. Ways in which the terminal equipment 1021 notifies the network device 101 of the radio link failure may be: way 1: logic connections in which radio link failures occur are notified in the Sidelink UE Information message; for example, the Sidelink UE Information message contains a destination ID where a radio link failure occurs, wherein in the Sidelink UE Information message, the destination ID may be expressed in such form as a destination L2 ID, a destination ID, or a destination Identity; way 2: logic connections excluding logic connections in which radio link failures occur are notified in the Sidelink UE Information message; for example, the Sidelink UE Information message contains destination IDs excluding destination IDs where radio link failures occur, wherein in the Sidelink UE Information message, the destination IDs may be expressed in such form as destination L2 IDs, destination IDs, or destination Identities.

Figure 4:
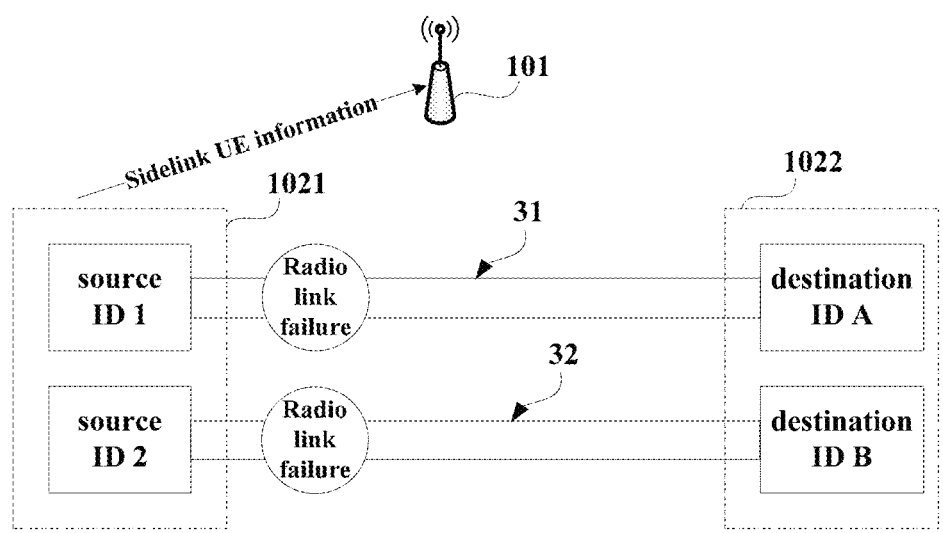
FIG. 4 is another schematic diagram of occurrence of a radio link failure in a sidelink between terminal equipments.

FIG. 4 is another schematic diagram of occurrence of a radio link failure in a sidelink between terminal equipments. As shown in FIG. 4, radio link failures occur in both logic connections 31 and 32 between the terminal equipment 1021 and the terminal equipment 1022, that is, radio link failures occur in all sidelinks between the terminal equipment 1021 and the terminal equipment 1022.

In the case where radio link failures occur in all sidelinks between the terminal equipment 1021 and the terminal equipment 1022, if notification is made in the way 1, it is needed that the Sidelink UE Information message includes all destination IDs where radio link failures occur. Hence, signaling overhead of the Sidelink UE Information message is relatively large; and if the notification is made in the way 2, as there exists no remaining destination ID, it is difficult to make notification matching the way 2.

According to the first aspect of the embodiments of this disclosure, in operation 202, the terminal equipment 1021 may individually notify occurrence of radio link failures in all sidelinks via the Sidelink UE Information message, and after the message of the terminal equipment 1021 is received, the network device 101 is able to determine that radio link failures occur in all sidelinks of the terminal equipment. Hence, there is no need to list all destination IDs in which radio link failures occur in the UE information message, thereby lowering signaling overhead.

Particular implementation of operation 202 shall be described below.

In Implementation 1, whether radio link failures occur in all sidelinks is notified by whether a sidelink transmission resource request list (sl-TxResourceReqList) field appears in the Sidelink UE Information message.

When the terminal equipment 1021 notifies the network device 101 of a radio link failure in the way 2, the sidelink transmission resource request list (sl-TxResourceReqList) field will appear in the Sidelink UE Information message, in which the remaining destination IDs except the destination IDs where radio link failures occur are listed.

For example, a type of the sidelink transmission resource request list (sl-TxResourceReqList) field is of a sidelink transmission resource request list (SL-TxResourceReqList), in which more than one sidelink transmission resource request elements (SL-TxResourceReq) are listed, and contents of the sidelink transmission resource request elements may have such information as a sidelink destination ID (sl-DestinationIdentity), a sidelink cast type (sl-CastType), and quality of service (QoS).

In Implementation 1, when the terminal equipment 1021 detects that radio link failures occur in all sidelinks between the terminal equipment 1021 and the terminal equipment 1022, the terminal equipment 1021 transmits a Sidelink UE Information message to the network device 101, no sidelink transmission resource request list (sl-TxResourceReqList) field appearing in the Sidelink UE Information message.

For example, an example of Implementation 1 is shown in Table 1 below.

TABLE 1

| SidelinkUEinformationNR field descriptions |
|---|
| sl-TxResourceReqList |
| To request the TX resource for NR sidelink communication to gNB in the Sidelink UE Information report. When SL RLF is declared for all the destination IDs, this IE is absent. |

In Implementation 2, when radio link failures occur in all sidelinks of the terminal equipment 1021, a content of the sidelink transmission resource request list (sl-TxResourceReqList) field in the Sidelink UE Information message transmitted by the terminal equipment 1021 the network device 101 is blank.

Implementation 2 differs from Implementation 1 in that the sidelink transmission resource request list (sl-TxResourceReqList) field appears in the Sidelink UE Information message, but the content of the sidelink transmission resource request list (sl-TxResourceReqList) field is blank.

In Implementation 2, that the content of the sidelink transmission resource request list (sl-TxResourceReqList) field is blank refers to that: the number of sidelink transmission resource request elements (SL-TxResourceReq) in the sidelink transmission resource request list (SL-TxResourceReqList) of the Sidelink UE Information message is 0.

That is, when the terminal equipment 1021 notifies the network device 101 of the radio link failure in the way 2, the number of the sidelink transmission resource request elements (SL-TxResourceReq) in the sidelink transmission resource request list (SL-TxResourceReqList) is at least one, while in Implementation 2 of this disclosure, the number of the sidelink transmission resource request elements (SL-TxResourceReq) in the sidelink transmission resource request list (SL-TxResourceReqList) may be 0, and that the number of the sidelink transmission resource request elements (SL-TxResourceReq) is 0 indicates that radio link failure occur in all sidelinks of the terminal equipment 1021.

For example, an example of Implementation 2 is shown in Table 2 and Table 3 below.

TABLE 2

SL-TxResourceReqList-r16 ::= SEQUENCE (SIZE (0..maxNrofSL-Dest-r16)) OF SL-Tx ResourceReq-r16

TABLE 3

SidelinkUEinformationNR field descriptions sl-TxResourceReqList
To request the TX resource for NR sidelink communication to gNB in the Sidelink UE Information report. When SL RLF is declared for all the destination IDs, this IE does not include SL-TxResourceReq.

In Implementation 3, in the case where radio link failures occur in all sidelinks of the terminal equipment 1021, the content of elements in the sidelink transmission resource request (SL-TxResourceReq) in the sidelink transmission resource request list (SL-TxResourceReqList) field of the Sidelink UE Information message is blank.

That the content of the sidelink transmission resource request elements (SL-TxResourceReq) is blank refers to that: the content of the sidelink transmission resource request elements have no such information as a sidelink destination ID (sl-DestinationIdentity) or a sidelink cast type (sl-CastType) or quality of service (QoS).

For example, in Implementation 3, in the case where radio link failures occur in all sidelinks of the terminal equipment 1021, there may still exist at least one sidelink transmission resource request element (SL-TxResourceReq) in the sidelink transmission resource request list (sl-TxResourceReqList) field of the Sidelink UE Information message, but contents of the sidelink transmission resource request elements (SL-TxResourceReq) are blank.

For example, an example of Implementation 3 is shown in Table 4 below.

TABLE 4

SL-TxResourceReq-r16::=    SEQUENCE {
   sl-DestinationIdentity-r16        SL-DestinationIdentity-r16,   OPTIONAL,
   sl-CastType-r16                   ENUMERATED {broadcast, groupcast, unicast, spare1}, OPTIONAL,
   sl-QoS-InfoList-r16               SEQUENCE (SIZE (1..maxNrofSL-QFIsPerDest-r16)) OF
SL-QoS-Info-r16,    OPTIONAL,
   sl-TypeTxSyncList-r16     SEQUENCE (SIZE (1..maxNrofFreqSL-r16)) OF SL-TypeTxSync-r16,
OPTIONAL,
   sl-TxInterestedFreqList-r16       SEQUENCE (SIZE (1..maxNrofFreqSL-r16)) OF INTEGER
(1..maxNrofFreqSL-r16)   OPTIONAL,
}

In Implementation 4, the Sidelink UE Information message may have indication information for indicating that radio link failures occur in all sidelinks of the terminal equipment 1021. For example, the indication information may have 1 bit, and when radio link failures occur in all sidelinks of the terminal equipment 1021, a first value may be taken for the indication information, so that the network device 101 may determine that radio link failures occur in all sidelinks of the terminal equipment 1021 according to the value of the indication information.

For example, an example of Implementation 4 is shown in Table 5 below, that is, the indication information shown in Table 5 is added to the Sidelink UE Information message.

TABLE 5 sl-rlf-indication   ENUMERATED {true}   OPTIONAL

According to the first aspect of the embodiments of this disclosure, the terminal equipment notifies that radio link failures occur in all sidelinks of the terminal equipment to the network device via the Sidelink UE Information message. Hence, that radio link failures occur in all sidelinks of the terminal equipment may be notified to the network device in a manner of occupying relatively few radio resources. And the network device may determine that radio link failures occur in all sidelinks of the terminal equipment 1021 by receiving the Sidelink UE Information message transmitted by the terminal equipment, thereby reducing allocation of dedicated sidelink radio resources, and improving utilization of radio resources.

Embodiment of a Second Aspect

The embodiment of the second aspect of this disclosure provides a communication method, which corresponds to the method executed by the terminal equipment in the embodiment of the first aspect. The method may be executed by a network device, which may be, for example, the network device 101 in FIG. 1.

Figures 5, 6:
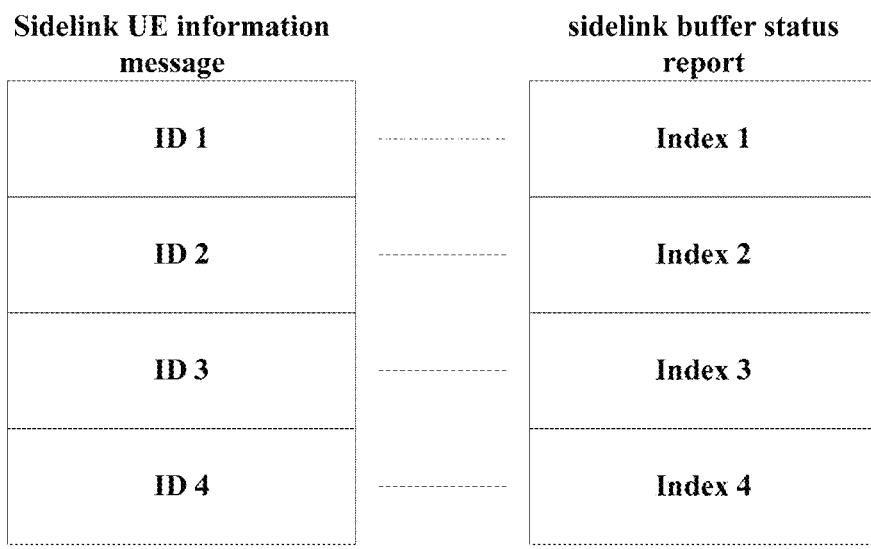
FIG. 5 is a schematic diagram of the communication method of V2X services of a second aspect of the embodiments of this disclosure.
FIG. 6 is a schematic diagram of mapping relationships between destination IDs in UE information and destination indices in a buffer status report.

FIG. 5 is a schematic diagram of the communication method of the second aspect of the embodiments of this disclosure. As shown in FIG. 5, the method includes:
   operation 501: the network device receives, via a Sidelink UE Information message, that radio link failures occur in all sidelinks of a terminal equipment notified by the terminal equipment.

In operation 501, the network device 101 may receive a Sidelink UE Information message from the terminal equipment 1021. Therefore, the network device 101 may determine according to the Sidelink UE Information message that radio link failures occur in all sidelinks of the terminal equipment 1021.

In one implementation, in the case where radio link failures occur in all sidelinks of the terminal equipment 1021, a sidelink transmission resource request list (sl-TxResourceReqList) field of the Sidelink UE Information message is absent in the Sidelink UE Information message.

In another implementation, in the case where radio link failures occur in all sidelinks of the terminal equipment, a content of the sidelink transmission resource request list (sl-TxResourceReqList) field of the Sidelink UE Information message is blank. That the content of the sidelink transmission resource request list (sl-TxResourceReqList)

field is blank refers to that: the number of sidelink transmission resource request elements (SL-TxResourceReq) in the sidelink transmission resource request list (SL-TxResourceReqList) of the Sidelink UE Information message is 0.

In a further implementation, in the case where radio link failures occur in all sidelinks of the terminal equipment, contents of elements (SL-TxResourceReq) in the sidelink transmission resource request list (sl-TxResourceReqList) field of the Sidelink UE Information message are blank. That the contents of elements (SL-TxResourceReq) are blank refers to that: the contents of elements (SL-TxResourceReq) have no such information as a sidelink destination ID (sl-DestinationIdentity) or a sidelink cast type (sl-CastType) or quality of service (QoS).

In yet another implementation, the Sidelink UE Information message includes indication information for indicating that radio link failures occur in all sidelinks of the terminal equipment; for example, the indication information may have 1 bit, and when radio link failures occur in all sidelinks of the terminal equipment 1021, a first value may be taken for the indication information.

Therefore, the network device 101 may determine that radio link failures occur in all sidelinks of the terminal equipment 1021 according to the value of the indication information.

According to the second aspect of the embodiments of this disclosure, the network device receives via the Sidelink UE Information message that radio link failures occur in all sidelinks of the terminal equipment notified by the terminal equipment. Hence, that radio link failures occur in all sidelinks of the terminal equipment may be notified to the network device in a manner of occupying relatively few radio resources. And when the network device determines that radio link failures occur in all sidelinks of the terminal equipment, allocation of dedicated sidelink radio resources may be reduced, and utilization of radio resources may be improved.

Third Aspect of Embodiments

The embodiment of the third aspect of this disclosure provides a communication method, which may be executed by a terminal equipment, such as the terminal equipment 1021 shown in FIG. 1.

The communication method of the third aspect of the embodiments of this disclosure is related to determination of mapping relationships between destination IDs in a Sidelink UE Information message and destination indices in a sidelink buffer status report.

FIG. 6 is a schematic diagram of the mapping relationships between the destination IDs in the UE information and the destination indices in the buffer status report. As shown in FIG. 6, when no radio link failure occurs in a sidelink of the terminal equipment 1021, destination IDs in the Sidelink UE Information message transmitted by the terminal equipment 1021 are, for example, ID1, ID2, ID3 and ID4. Destination indices in the sidelink buffer status report (SL BSR) transmitted by the terminal equipment 1021 to the network device 101 are, for example, index 1, index 2, index 3 and index 4. As shown in FIG. 6, ID1, ID2, ID3 and ID4 correspond respectively to index 1, index 2, index 3 and index 4.

Figure 7:
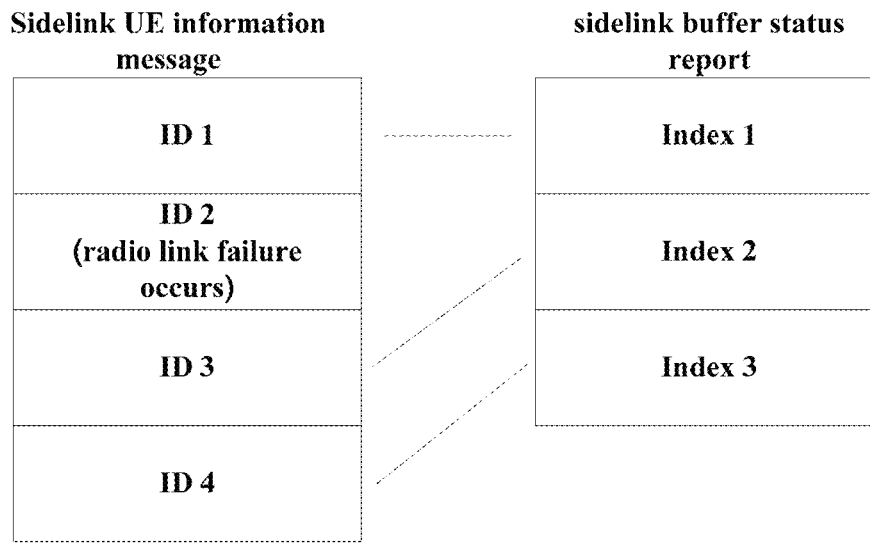
FIG. 7 is another schematic diagram of the mapping relationships between destination IDs in UE information and destination indices in a buffer status report.

FIG. 7 is another schematic diagram of the mapping relationships between the destination IDs in the UE information and the destination indices in the buffer status report. As shown in FIG. 7, when a radio link failure occurs in the sidelink of the terminal equipment 1021, for example, a radio link failure occurs in the destination ID 2 (ID2), a destination ID where the radio link failure occurs does not need to correspond to a destination index, thus, the mapping relationships shown in FIG. 6 shall be changed. Therefore, the mapping relationships between the destination IDs and the destination indices need to be redetermined, so that the network device 101 allocates sidelink communication resources for the terminal equipment.

Figure 8:
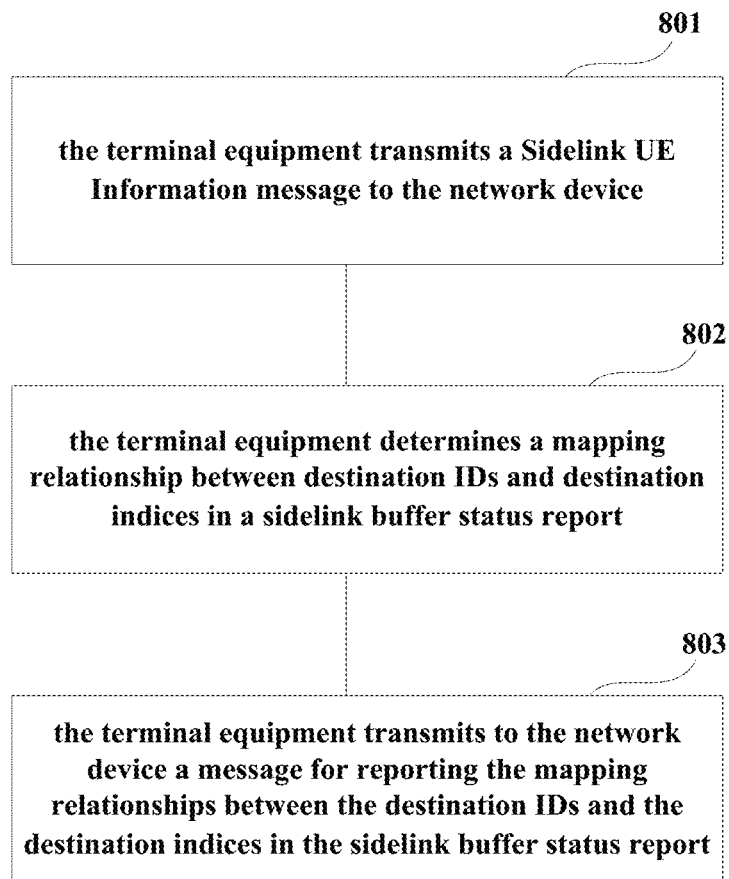
FIG. 8 is a schematic diagram of the communication method of V2X services of a third aspect of the embodiments of this disclosure.

FIG. 8 is a schematic diagram of the communication method of V2X services of the third aspect of the embodiments of this disclosure. As shown in FIG. 8, the method includes:
  operation 801: the terminal equipment 1021 transmits a Sidelink UE Information message to the network device 101; and
  operation 802: the terminal equipment 1021 determines a mapping relationship between destination IDs and destination indices in a sidelink buffer status report.

In the embodiment of this disclosure, in operation 801, in the case where the terminal equipment 1021 detects that a radio link failure occurs in the sidelink, the terminal equipment 1021 may notify the network device 101 of the radio link failure in way 1, that is, the Sidelink UE Information message transmitted by the terminal equipment 1021 to the network device 101 may include a destination ID where a radio link failure occurs.

In operation 802, the terminal equipment 1021 may determine mapping relationships between destination IDs excluding the destination ID in which the radio link failure occurs and destination indices in the sidelink buffer status report.

Particular implementations of operation 802 shall be described below.

In Implementation 1, the terminal equipment 1021 may map the remaining destination IDs and the destination indices in the sidelink buffer status report according to a predetermined rule.

The mapping performed according to the predetermined rule may be any one of the following schemes 1-4:
  scheme 1: mapping the remaining destination IDs after the destination ID where the radio link failure occurs is removed with destination indices in a sidelink buffer status report sequentially according to an order of destination IDs in a previous Sidelink UE Information message; for example, the order of the destination IDs in the previous Sidelink UE Information message is ID1, ID2, ID3 and ID4, destination IDs excluding ID2 where a radio link failure occurs is removed are ID1, ID3 and ID4, and the remaining destination IDs are mapped sequentially with the destination indices in the sidelink buffer status report, that is, ID1, ID3 and ID4 are respectively mapped with index 1, index 2 and index 3;
  scheme 2: mapping the destination IDs in a descending or ascending order with the destination indices in the sidelink buffer status report sequentially, such as mapping the remaining destination IDs shown in FIG. 7 in a descending order (e.g. ID4, ID3, ID1) or in an ascending order (e.g. ID1, ID3, ID4) with the destination indices in the sidelink buffer status report sequentially, that is, ID4, ID3, ID1 are respectively mapped with index1, index2, index 3, or, ID1, ID3, ID4 are respectively mapped with index1, index2, index 3;
  scheme 3: when the destination indices are identical to predetermined bits in the destination IDs, the destination IDs and the destination indices are mapped according to the destination indices and the predetermined bits in the destination IDs; for example, the destination IDs may have 24 bits, and the destination indices may have 3 bits, and the destination indices may be identical to lower 3 bits or higher 3 bits of the destination IDs, that is, index 1, index 2, index 3 and index 4 are lower 3 bits or higher 3 bits of ID1, ID2, ID3 and ID4 respectively; and in a case where a radio link failure occurs in ID2, according to the destination indices and the lower 3 bits or higher 3 bits in the destination IDs, index 1, index 3 and index 4 are respectively mapped with ID1, ID 3 and ID 4;

scheme 4: after filling a last destination ID into a position of the destination ID where the radio link failure occurs, mapping the destination IDs with the destination indices sequentially; for example, filling the last destination ID 4 into a position of ID2, and then mapping the destination IDs sequentially with the destination indices, that is, mapping ID1, ID4 and ID3 respectively with index 1, index 2 and index 3.

In Implementation 2, the terminal equipment 1021 may map the remaining destination IDs with the destination indices in the sidelink buffer status report according to a configuration message transmitted by the network device 101, the configuration message being able to be used for configuring the mapping relationships between the destination IDs and the destination indices in the sidelink buffer status report.

In Implementation 3, the terminal equipment 1021 may determine mapping relationships between the remaining destination IDs and the destination indices in the sidelink buffer status report on its own.

In Implementation 3, as shown in FIG. 8, the method may further include:

operation 803: the terminal equipment transmits to the network device a message for reporting the mapping relationships between the destination IDs and the destination indices in the sidelink buffer status report.

With operation 803, the mapping relationships determined by the terminal equipment may be reported to the network device, whereby the network device and the terminal equipment may obtain identical mapping relationships.

According to the third aspect of the embodiments of this disclosure, when a radio link failure occurs in the sidelink of the terminal equipment, the mapping relationships between the remaining destination IDs and the destination indices in the sidelink buffer status report may be determined without modifying the content of the sidelink buffer status report, and the network device and the terminal equipment may be enable to have the same understanding of the mapping relationships, so that the network device is facilitated to allocate appropriate sidelink communication resources for the terminal equipment.

Embodiment of a Fourth Aspect

The embodiment of the fourth aspect of this disclosure provides a communication method, which corresponds to the method executed by the terminal equipment in the embodiment of the third aspect. The method may be executed by a network device, which may be, for example, the network device 101 in FIG. 1.

Figure 9:
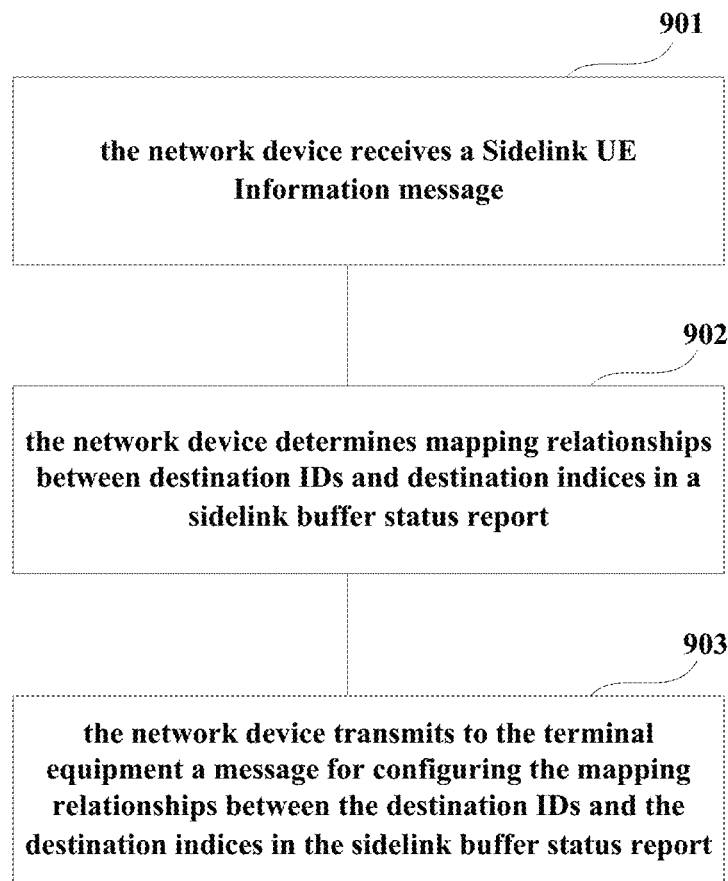
FIG. 9 is a schematic diagram of the communication method of a fourth aspect of the embodiments of this disclosure.

FIG. 9 is a schematic diagram of the communication method of the fourth aspect of the embodiments of this disclosure. As shown in FIG. 9, the method includes:

operation 901: the network device receives a Sidelink UE Information message; and operation 902: the network device determines mapping relationships between destination IDs and destination indices in a sidelink buffer status report.

In Implementation 1, the network device 101 may map remaining destination IDs with the destination indices in the sidelink buffer status report according to a predetermined rule.

The mapping performed according to the predetermined rule may be any one of the following schemes 1-4:

scheme 1: mapping the remaining destination IDs after the destination ID where the radio link failure occurs is removed with destination indices in a sidelink buffer status report sequentially according to an order of destination IDs in a previous Sidelink UE Information message;

scheme 2: mapping the destination IDs in a descending or ascending order with the destination indices in the sidelink buffer status report sequentially;

scheme 3: when the destination indices are identical to predetermined bits in the destination IDs, the destination IDs and the destination indices are mapped according to the destination indices and predetermined bits in the destination IDs;

scheme 4: after filling a last destination ID into a position of the destination ID where the radio link failure occurs, mapping the destination IDs with the destination indices sequentially.

For detailed description of the above schemes 1-4, reference may be made to relevant description of the third aspect of the embodiments of this disclosure.

In Implementation 2, the network device 101 determines the mapping relationships between the remaining destination IDs and the destination indices in the sidelink buffer status report.

In Implementation 2, as shown in FIG. 9, the method further includes:

operation 903: the network device transmits to the terminal equipment a message for configuring the mapping relationships between the destination IDs and the destination indices in the sidelink buffer status report.

With operation 903, the network device 101 may transmit the mapping relationships determined by the network device 101 as configuration information to the terminal equipment 1021, so that the network device and the terminal equipment may obtain identical mapping relationships.

In the third Implementation, the network device may determine the mapping relationships according to the message received from the terminal equipment for reporting the mapping relationships between the destination IDs and the destination indices in the sidelink buffer status report. The message may be, for example, a Sidelink UE Information message.

Fifth Aspect of Embodiments

The embodiment of the fifth aspect of this disclosure provides a communication method, which may be executed by a terminal equipment, such as the terminal equipment 1021 shown in FIG. 1.

The communication method of the fifth aspect of the embodiments of this disclosure is related to determination of a way of notifying a radio link failure to a network device.

Figure 10:
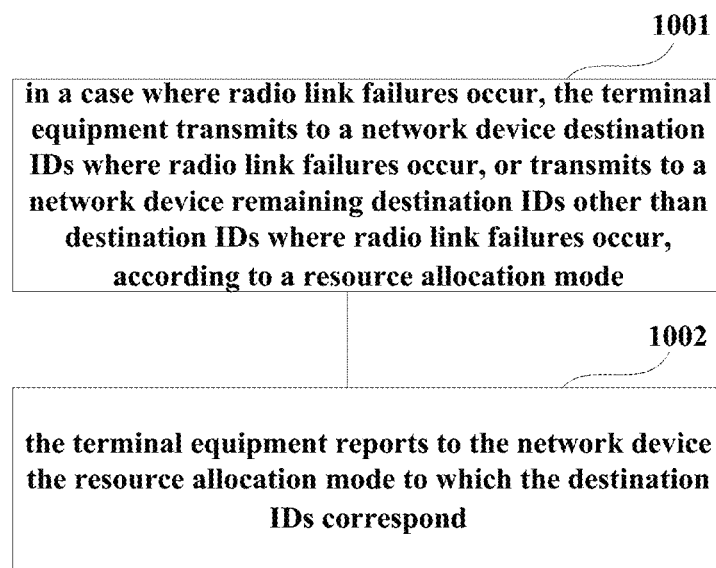
FIG. 10 is a schematic diagram of the communication method of V2X services of a fifth aspect of the embodiments of this disclosure.

FIG. 10 is a schematic diagram of the communication method of V2X services of the fifth aspect of the embodiments of this disclosure. As shown in FIG. 10, the method includes:

operation 1001: in a case where radio link failures occur, the terminal equipment transmits to a network device destination IDs where radio link failures occur, or transmits to a network device remaining destination IDs other than destination IDs where radio link failures occur, according to a resource allocation mode.

According to the fifth aspect of the embodiments of this disclosure, whether the radio link failures are reported to the network device in way 1 or way 2 may be determined according to the resource allocation mode. Therefore, an appropriate way may be used in reporting, thereby lowering overhead of the Sidelink UE Information message and avoiding that the sidelink buffer status report becomes complicated.

In at least one embodiment, when the resource allocation mode is allocating resources by the network device (such as a mode-1 resource allocation mode), the terminal equipment transmits to the network device the destination IDs excluding the destination IDs where radio link failures occur, that is, the terminal equipment notifies the network device of the radio link failures in the way 2. Therefore, the remaining destination IDs may easily correspond to the destination indices in the sidelink buffer status report.

In at least one embodiment, when the resource allocation mode is allocating resources by the terminal equipment (such as the mode-2 resource allocation mode), the terminal equipment transmits the destination ID where radio link failure occurs to the network device, that is, the terminal equipment notifies the network device of the radio link failure in the way 1, thereby lowering overhead of the Sidelink UE Information message.

In at least one embodiment, the terminal equipment 1021 may set a resource allocation mode according to configuration information transmitted by the network device 101. For example, if the terminal equipment 1021 uses one resource allocation mode, all destination IDs of the terminal equipment 1021 correspond to the same resource allocation mode, that is, the terminal equipment allocates resources or the network device allocates resources; and if the terminal equipment 1021 uses two resource allocation modes, the terminal equipment 1021 may, according to the configuration information, set a resource allocation mode of some destination IDs to be allocating resources by the network device, and set a resource allocation mode of other destination IDs to be allocating resources by the terminal equipment.

Furthermore, when the terminal equipment 1021 sets a resource allocation mode according to the configuration information transmitted by the network device 101, it may determine to report the radio link failure to the network device in way 1 or way 2 according to the resource allocation mode. For example, for destination IDs of allocating resources by the network device, it reports radio link failures of these destination IDs in way 2; and for destination IDs of allocating resources by the terminal equipment, it reports radio link failures of these destination IDs in way 1.

In at least one embodiment, the terminal equipment 1021 may determine a resource allocation mode to which the destination ID corresponds. For example, if the terminal equipment 1021 uses one resource allocation mode, all destination IDs of the terminal equipment 1021 correspond to the same resource allocation mode, that is, the terminal equipment allocates resources or the network device allocates resources; if the terminal equipment 1021 uses two resource allocation modes, the terminal equipment 1021 may determine on its own, set a resource allocation mode of a part of destination IDs to be allocating resources by the network device, and set a resource allocation mode of other destination IDs to be allocating resources by the terminal equipment.

Moreover, in a case where a resource allocation mode is determined, the terminal equipment 1021 may determine to report the radio link failure to the network device in the way 1 or the way 2 according to the resource allocation mode. For example, for destination IDs of allocating resources by the network device, it reports radio link failures of these destination IDs in the way 2; and for destination IDs of allocating resources by the terminal equipment, it reports radio link failures of these destination IDs in the way 1.

As shown in FIG. 10, when a resource allocation mode is determined by the terminal equipment 1021, the method may further include:

operation 1002: the terminal equipment reports to the network device the resource allocation mode to which the destination IDs correspond.

In operation 1002, the terminal equipment may report the resource allocation mode to which the destination IDs correspond to the network device via the Sidelink UE Information message.

According to the fifth aspect of the embodiments of this disclosure, whether the radio link failures are reported to the network device in the way 1 or the way 2 may be determined according to the resource allocation mode. Therefore, an appropriate way may be used in reporting, thereby lowering overhead of the Sidelink UE Information message and avoiding that the sidelink buffer status report becomes complicated.

Embodiment of a Sixth Aspect

The sixth aspect of the embodiments of this disclosure provides a communication method, which corresponds to the method executed by the terminal equipment in the embodiment of the fifth aspect. The method may be executed by a network device, which may be, for example, the network device 101 in FIG. 1.

FIG. 11 is a schematic diagram of the communication method of the sixth aspect of the embodiments of this disclosure. As shown in FIG. 11, the method includes:

operation 1101: in a case where radio link failures occur, the network device receives destination IDs where radio link failures occur from a terminal equipment, or receives remaining destination IDs other than destination IDs where radio link failures occur from a terminal equipment, according to a resource allocation mode to which the terminal equipment corresponds.

In operation 1101, in a case where the resource allocation mode is allocating resources by the network device (e.g. mode-1 resource allocation mode), the network device receives, from the terminal equipment, destination IDs excluding destination IDs where radio link failures occur.

In operation 1101, in a case where the resource allocation mode is allocating resources by the terminal equipment (e.g. mode-2 resource allocation mode), the network device receives the destination IDs where radio link failures occur from the terminal equipment.

In at least one embodiment, the resource allocation mode of the terminal equipment may be determined by the network device, and transmit configuration information for configuring the resource allocation mode to the terminal equipment. For example, if the terminal equipment 1021 uses one resource allocation mode, the configuration information may configure all destination IDs of the terminal equipment 1021 to be corresponding to the same resource allocation mode, that is, the terminal equipment allocates resources or the network device allocates resources; if the terminal equipment 1021 uses two resource allocation modes, the network device 101 may configure a resource allocation mode of a part of destination IDs to be allocating resources by the network device, and configure a resource allocation mode of other destination IDs to be allocating resources by the terminal equipment.

In at least one embodiment, the terminal equipment may determine the resource allocation mode of the terminal equipment, and the network device receives information transmitted by the terminal equipment for notifying the resource allocation mode. For example, the information for notifying the resource allocation mode may be transmitted to the network device via a Sidelink UE Information message.

Furthermore, when the terminal equipment 1021 determines the resource allocation mode according to the configuration information or on its own, it may determine to report the radio link failure to the network device in way 1 or way 2 according to the resource allocation mode. For example, for destination IDs of allocating resources by the network device, it reports radio link failures of these destination IDs in mode 2; and for destination IDs of allocating resources by the terminal equipment, it reports radio link failures of these destination IDs in mode 1.

According to the sixth aspect of the embodiments of this disclosure, whether the radio link failures are reported to the network device in mode 1 or mode 2 may be determined according to the resource allocation mode. Therefore, an appropriate mode may be used in reporting, thereby lowering overhead of the Sidelink UE Information message and avoiding that the sidelink buffer status report becomes complicated.

Embodiment of a Seventh Aspect

The embodiment of the seventh aspect of this disclosure provides a communication method, which may be executed by a terminal equipment, such as the terminal equipment 1021 shown in FIG. 1.

The communication method of the embodiment of the seventh aspect of this disclosure relates to how to lower signaling overhead of a Sidelink UE Information message.

In the embodiment of the seventh aspect of this disclosure, the terminal equipment may determine that the destination IDs correspond to the first index according to configuration information or on its own, and transmit the first index in a subsequent Sidelink UE Information message to substitute the corresponding destination IDs. Hence, signaling overhead of the Sidelink UE Information message may be lowered.

FIG. 12 is a schematic diagram of the communication method of V2X services of the seventh aspect of the embodiments of this disclosure. As shown in FIG. 12, the method includes:

operation 1201: the terminal equipment receives a radio resource control (RRC) message transmitted by a network device, the radio resource control message being used for configuring a first index for destination IDs in a Sidelink UE Information message that has been transmitted by the terminal equipment; and operation 1202: the terminal equipment transmits the Sidelink UE Information message containing the first index to which the destination IDs correspond.

In the method in FIG. 12, the terminal equipment determines a correspondence relationship between destination IDs and the first index according to the configuration information of the network device (i.e. the radio resource control message).

Figure 13:
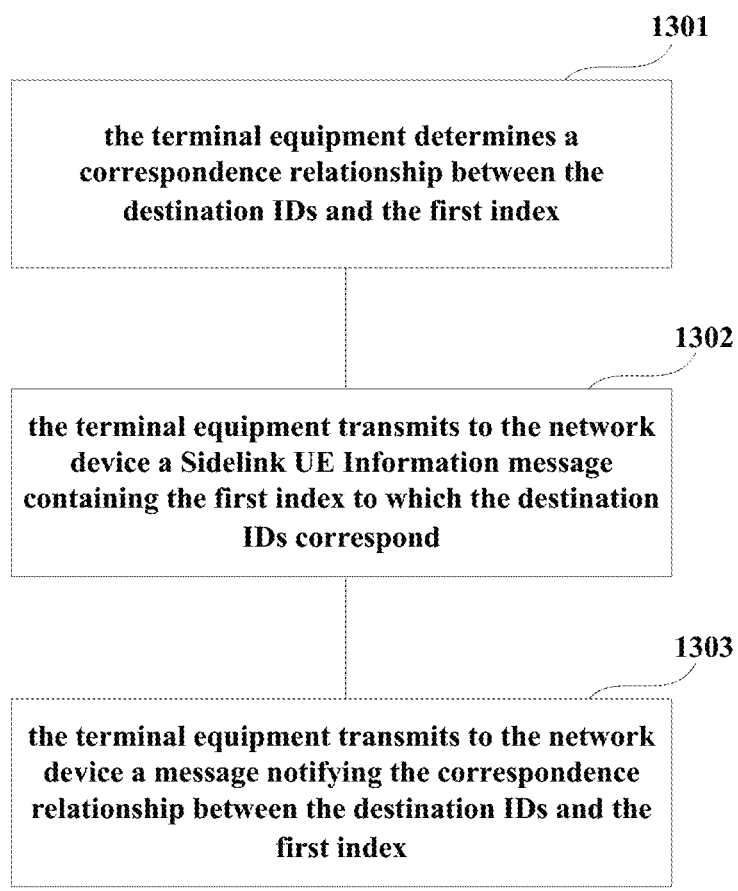
FIG. 13 is another schematic diagram of the communication method of V2X services of the seventh aspect of the embodiments of this disclosure.

FIG. 13 is another schematic diagram of the communication method of V2X services of the seventh aspect of the embodiments of this disclosure. As shown in FIG. 13, the method includes:

operation 1301: the terminal equipment determines a correspondence relationship between the destination IDs and the first index; and operation 1302: the terminal equipment transmits to the network device a Sidelink UE Information message containing the first index to which the destination IDs correspond.

In the method in FIG. 13, the terminal equipment determines the correspondence relationship between the destination IDs and the first index on its own.

As shown in FIG. 13, the method further includes:

operation 1303: the terminal equipment transmits to the network device a message notifying the correspondence relationship between the destination IDs and the first index.

According to operation 1303, when the terminal equipment determines the correspondence relationship between the destination IDs and the first index, it may notify the correspondence relationship to the network device, whereby the network device may learn the correspondence relationship.

In the seventh aspect of the embodiments of this disclosure, destination indices to which destination IDs in a sidelink buffer status report (SL BSR) correspond may be identical to or different from the first index.

According to the seventh aspect of this disclosure, the terminal equipment may determine that the destination IDs correspond to the first index according to configuration information or on its own, and transmit the first index in a subsequent Sidelink UE Information message to substitute the corresponding destination IDs. Hence, signaling overhead of the Sidelink UE Information message may be lowered.

Embodiment of an Eighth Aspect

The embodiment of the eight aspect of this disclosure provides a communication method, which corresponds to the method executed by the terminal equipment in the embodiment of the seventh aspect. The method may be executed by a network device, which may be, for example, the network device 101 in FIG. 1.

Figure 14:
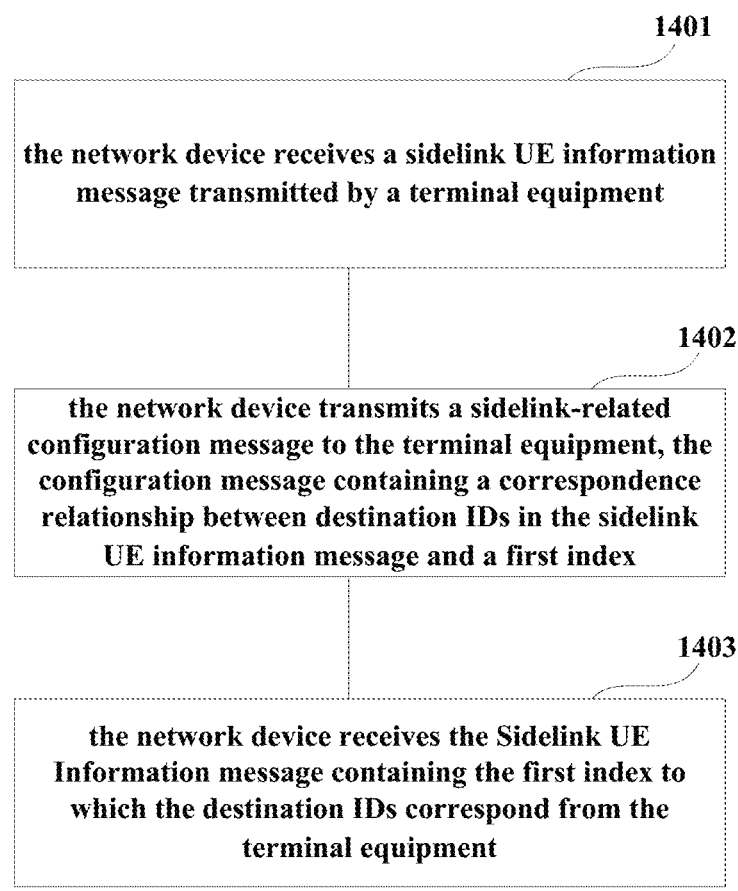
FIG. 14 is a schematic diagram of the communication method of the eighth aspect of the embodiments of this disclosure.

FIG. 14 is a schematic diagram of the communication method of the eighth aspect of the embodiments of this disclosure. As shown in FIG. 14, the method includes:

operation 1401: the network device receives a Sidelink UE Information message transmitted by a terminal equipment; and operation 1402: the network device transmits a sidelink-related configuration message to the terminal equipment, the configuration message containing a correspondence relationship between destination IDs in the Sidelink UE Information message and a first index.

In operation 1401, the network device receives the Sidelink UE Information message transmitted by the terminal equipment, the Sidelink UE Information message containing a destination ID.

In operation 1402, the network device may set correspondence relationships between destination IDs and the first index for the destination IDs in the received Sidelink UE Information message, generate a configuration message based on the correspondence relationships, and transmit the configuration message to the terminal equipment, whereby the terminal equipment may determine the correspondence relationships between the destination IDs and the first index according to the configuration message.

Furthermore, after the terminal equipment determines the correspondence relationships between the destination IDs and the first index, while transmitting the Sidelink UE Information message, the Sidelink UE Information message may include the first index to which the destination IDs correspond. For example, as shown in FIG. 14, the method may further include:
- operation 1403: the network device receives the Sidelink UE Information message containing the first index to which the destination IDs correspond from the terminal equipment.

In the method shown in FIG. 14, the terminal equipment determines the correspondence relationships between the destination IDs and the first index according to the configuration information transmitted by the network device. However, this disclosure is not limited thereto, and the terminal equipment may determine the correspondence relationships between destination IDs and the first index on its own.

Figure 15:
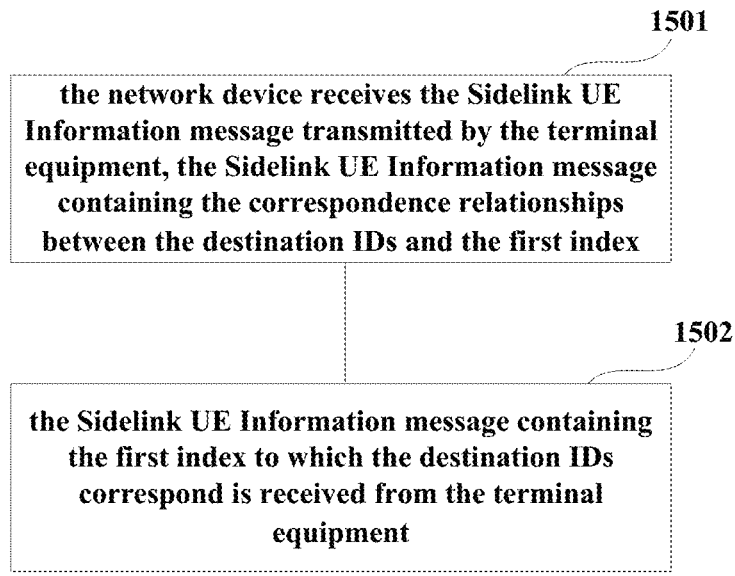
FIG. 15 is another schematic diagram of the communication method of the eighth aspect of the embodiments of this disclosure.

FIG. 15 is another schematic diagram of the communication method of the eighth aspect of the embodiments of this disclosure. As shown in FIG. 15, the method includes:
- operation 1501: the network device receives the Sidelink UE Information message transmitted by the terminal equipment, the Sidelink UE Information message containing the correspondence relationships between the destination IDs and the first index; and
- operation 1502: the Sidelink UE Information message containing the first index to which the destination IDs correspond is received from the terminal equipment.

In the method shown in FIG. 15, the terminal equipment determines the correspondence relationships between the destination IDs and the first index on its own, and notifies the network device of the correspondence relationships via the Sidelink UE Information message.

In operation 1502, the Sidelink UE Information message transmitted by the terminal equipment may not contain the destination IDs, but may contain the first index to which the destination IDs correspond, thereby lowering signaling overhead of the Sidelink UE Information message.

In the embodiment of the eighth aspect of this disclosure, the destination index to which each destination ID in the sidelink buffer status report (SL BSR) corresponds may be identical to or different from the first index.

According to the embodiment of the eighth aspect of this disclosure, the network device may configure or may be notified of the correspondence relationships between the destination IDs and the first index, and the first index is contained in a subsequent Sidelink UE Information message to substitute the corresponding destination IDs. Hence, signaling overhead of the Sidelink UE Information message may be lowered.

Embodiment of a Ninth Aspect

The embodiment of the seventh aspect of this disclosure provides a communication method, which may be executed by a terminal equipment, such as the terminal equipment 1021 shown in FIG. 1.

The communication method of the embodiment of the ninth aspect of this disclosure relates to how to lower signaling overhead of a Sidelink UE Information message.

Figure 16:
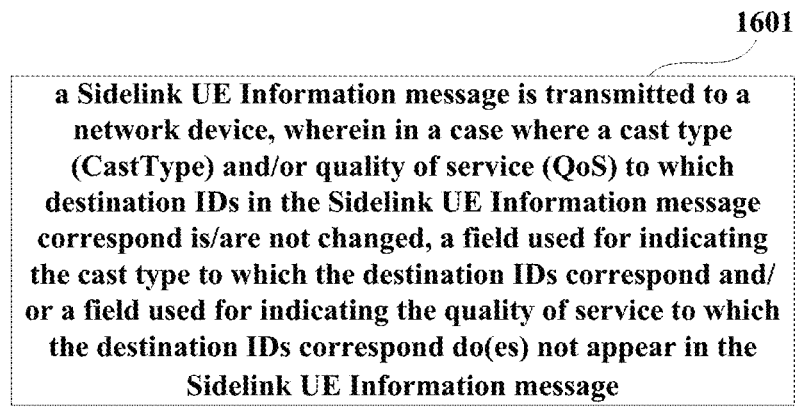
FIG. 16 is a schematic diagram of the communication method of V2X services of a ninth aspect of the embodiments of this disclosure.

FIG. 16 is a schematic diagram of the communication method of V2X services of the ninth aspect of the embodiments of this disclosure. As shown in FIG. 16, the method includes:
- operation 1601: a Sidelink UE Information message is transmitted to a network device, wherein in a case where a cast type (CastType) and/or quality of service (QoS) to which destination IDs in the Sidelink UE Information message correspond is/are not changed, a field used for indicating the cast type to which the destination IDs correspond and/or a field used for indicating the quality of service to which the destination IDs correspond is(are) absent in the Sidelink UE Information message.

The field used for indicating the cast type to which the destination IDs correspond may be expressed as sl-CastType, for example.

According to the embodiment of the ninth aspect of this disclosure, signaling overhead of the Sidelink UE Information message may be lowered.

Embodiment of a Tenth Aspect

The embodiment of the tenth aspect of this disclosure provides a communication method, which corresponds to the method executed by the terminal equipment in the embodiment of the ninth aspect. The method may be executed by a network device, which may be, for example, the network device 101 in FIG. 1.

FIG. 17 is a schematic diagram of the communication method of the tenth aspect of the embodiments of this disclosure. As shown in FIG. 17, the method includes:
- operation 1701: a Sidelink UE Information message is received from a terminal equipment, wherein in a case where a cast type (CastType) and/or quality of service (QoS) to which destination IDs in the Sidelink UE Information message correspond is/are not changed, a field used for indicating the cast type to which the destination IDs correspond and/or a field used for indicating the quality of service to which the destination IDs correspond is(are) absent in the Sidelink UE Information message.

The field used for indicating the cast type to which the destination IDs correspond may be expressed as sl-CastType, for example.

According to the embodiment of the tenth aspect of this disclosure, signaling overhead of the Sidelink UE Information message may be lowered.

Embodiment of a Twelfth Aspect

The embodiment of the twelfth aspect of this disclosure at least provides a communication apparatus, which is applicable to a terminal equipment, and corresponds respectively to the methods in the embodiments of the first, third, fifth, seventh and ninth aspects. As a principle of the communication apparatus for solving problems is similar to that of the methods in the embodiments of the first, third, fifth, seventh and ninth aspects, reference may be made to the implementations of the methods in the embodiments of the first, third, fifth, seventh and ninth aspects for implementation of this apparatus, with identical contents being going to be described herein any further.

FIG. 18 is a schematic diagram of the communication apparatus of the twelfth aspect of the embodiments of this disclosure. As shown in FIG. 18, a communication apparatus 180 includes a first communication portion 181. The first communication portion 181 may carry out the method shown in FIG. 2. Reference may be made to the description of the steps in FIG. 2 for specific description of FIG. 18.

FIG. 19 is another schematic diagram of the communication apparatus of the twelfth aspect of the embodiments of this disclosure. As shown in FIG. 19, a communication apparatus 190 includes a third communication unit 191. The third communication unit 191 may carry out the method shown in FIG. 8. Reference may be made to the description of the steps in FIG. 8 for specific description of FIG. 19.

Figure 20:
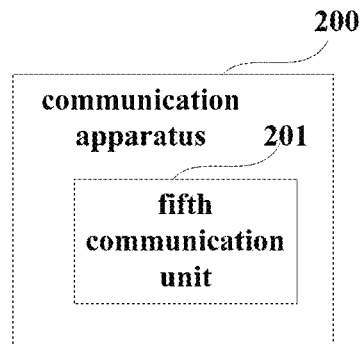
FIG. 20 is a further schematic diagram of the communication apparatus of the twelfth aspect of the embodiments of this disclosure.

FIG. 20 is a further schematic diagram of the communication apparatus of the twelfth aspect of the embodiments of this disclosure. As shown in FIG. 20, a communication apparatus 200 includes a fifth communication unit 201. The fifth communication unit 201 may carry out the method shown in FIG. 10. Reference may be made to the description of the steps in FIG. 10 for specific description of FIG. 20.

Figure 21:
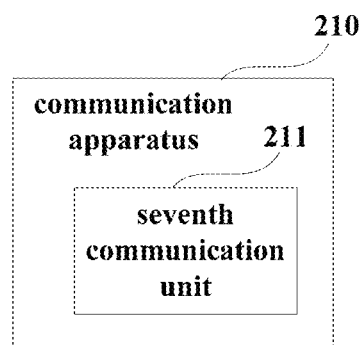
FIG. 21 is still another schematic diagram of the communication apparatus of the twelfth aspect of the embodiments of this disclosure.

FIG. 21 is still another schematic diagram of the communication apparatus of the twelfth aspect of the embodiments of this disclosure. As shown in FIG. 21, a communication apparatus 210 includes a seventh communication unit 211. The seventh communication unit 211 may carry out the method shown in FIG. 12. Reference may be made to the description of the steps in FIG. 12 for specific description of FIG. 21.

Figure 22:
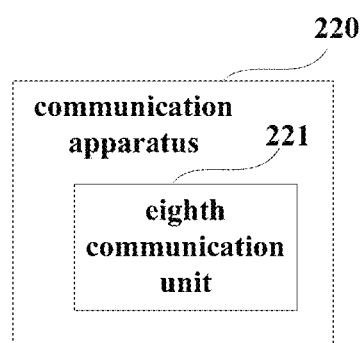
FIG. 22 is yet another schematic diagram of the communication apparatus of the twelfth aspect of the embodiments of this disclosure.

FIG. 22 is yet another schematic diagram of the communication apparatus of the twelfth aspect of the embodiments of this disclosure. As shown in FIG. 22, a communication apparatus 220 includes an eighth communication unit 221. The eighth communication unit 221 may carry out the method shown in FIG. 13. Reference may be made to the description of the steps in FIG. 13 for specific description of FIG. 22.

Figure 23:
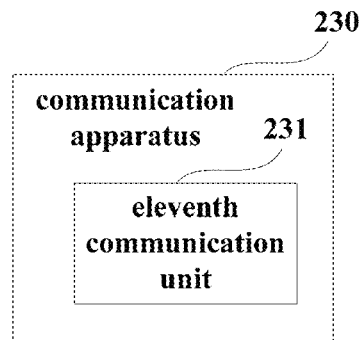
FIG. 23 is yet still another schematic diagram of the communication apparatus of the twelfth aspect of the embodiments of this disclosure.

FIG. 23 is yet still another schematic diagram of the communication apparatus of the twelfth aspect of the embodiments of this disclosure. As shown in FIG. 23, a communication apparatus 230 includes an eleventh communication unit 231. The eleventh communication unit 231 may carry out the method shown in FIG. 16. Reference may be made to the description of the steps in FIG. 16 for specific description of FIG. 23.

Embodiment of a Thirteenth Aspect

The embodiment of the thirteenth aspect of this disclosure at least provides a communication apparatus, which is applicable to a network device, and corresponds respectively to the methods in the embodiments of the second, fourth, sixth, eighth and tenth aspects. As a principle of the communication apparatus for solving problems is similar to that of the methods in the embodiments of the second, fourth, sixth, eighth and tenth aspects, reference may be made to the implementations of the methods in the embodiments of the second, fourth, sixth, eighth and tenth aspects for implementation of this apparatus, with identical contents being going to be described herein any further.

Figure 24:
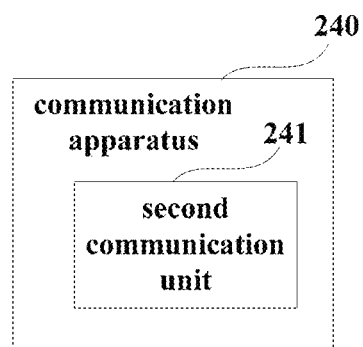
FIG. 24 is a schematic diagram of the communication apparatus of a thirteenth aspect of the embodiments of this disclosure.

FIG. 24 is a schematic diagram of the communication apparatus of the thirteenth aspect of the embodiments of this disclosure. As shown in FIG. 24, a communication apparatus 240 includes a second communication unit 241. The second communication unit 241 may carry out the method shown in FIG. 5. Reference may be made to the description of the steps in FIG. 5 for specific description of FIG. 24.

Figure 25:
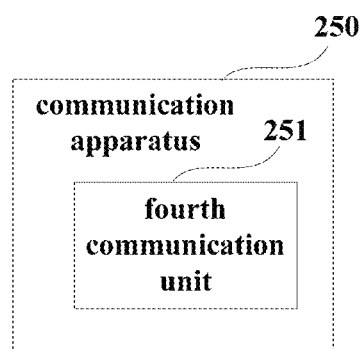
FIG. 25 is another schematic diagram of the communication apparatus of the thirteenth aspect of the embodiments of this disclosure.

FIG. 25 is another schematic diagram of the communication apparatus of the thirteenth aspect of the embodiments of this disclosure. As shown in FIG. 25, a communication apparatus 250 includes a fourth communication unit 251. The fourth communication unit 251 may carry out the method shown in FIG. 9. Reference may be made to the description of the steps in FIG. 9 for specific description of FIG. 25.

Figure 26:
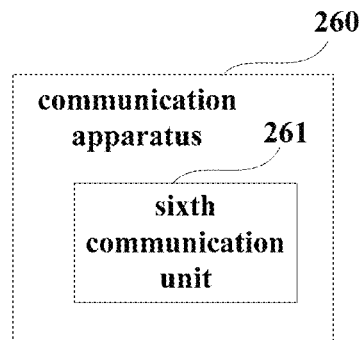
FIG. 26 is a further schematic diagram of the communication apparatus of the thirteenth aspect of the embodiments of this disclosure.

FIG. 26 is a further schematic diagram of the communication apparatus of the thirteenth aspect of the embodiments of this disclosure. As shown in FIG. 26, a communication apparatus 260 includes a sixth communication unit 261. The sixth communication unit 261 may carry out the method shown in FIG. 11. Reference may be made to the description of the steps in FIG. 11 for specific description of FIG. 26.

Figure 27:
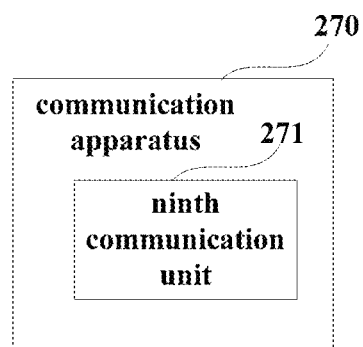
FIG. 27 is still another schematic diagram of the communication apparatus of the thirteenth aspect of the embodiments of this disclosure.

FIG. 27 is still another schematic diagram of the communication apparatus of the thirteenth aspect of the embodiments of this disclosure. As shown in FIG. 27, a communication apparatus 270 includes a ninth communication unit 271. The ninth communication unit 271 may carry out the method shown in FIG. 14. Reference may be made to the description of the steps in FIG. 14 for specific description of FIG. 27.

Figure 28:
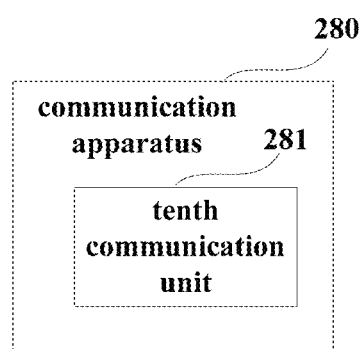
FIG. 28 is yet another schematic diagram of the communication apparatus of the thirteenth aspect of the embodiments of this disclosure.

FIG. 28 is yet another schematic diagram of the communication apparatus of the thirteenth aspect of the embodiments of this disclosure. As shown in FIG. 28, a communication apparatus 280 includes a tenth communication unit 281. The tenth communication unit 281 may carry out the method shown in FIG. 15. Reference may be made to the description of the steps in FIG. 15 for specific description of FIG. 28.

Figure 29:
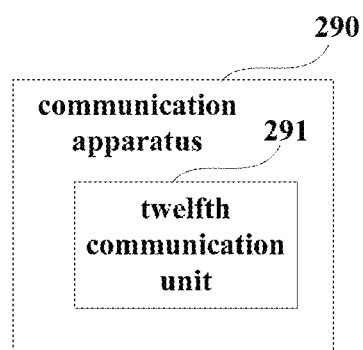
FIG. 29 is yet still another schematic diagram of the communication apparatus of the thirteenth aspect of the embodiments of this disclosure.

FIG. 29 is yet still another schematic diagram of the communication apparatus of the thirteenth aspect of the embodiments of this disclosure. As shown in FIG. 29, a communication apparatus 290 includes a twelfth communication unit 291. The twelfth communication unit 291 may carry out the method shown in FIG. 17. Reference may be made to the description of the steps in FIG. 17 for specific description of FIG. 29.

Embodiment of a Fourteenth Aspect

The embodiment of the fourteenth aspect provides a terminal equipment.

Figure 30:
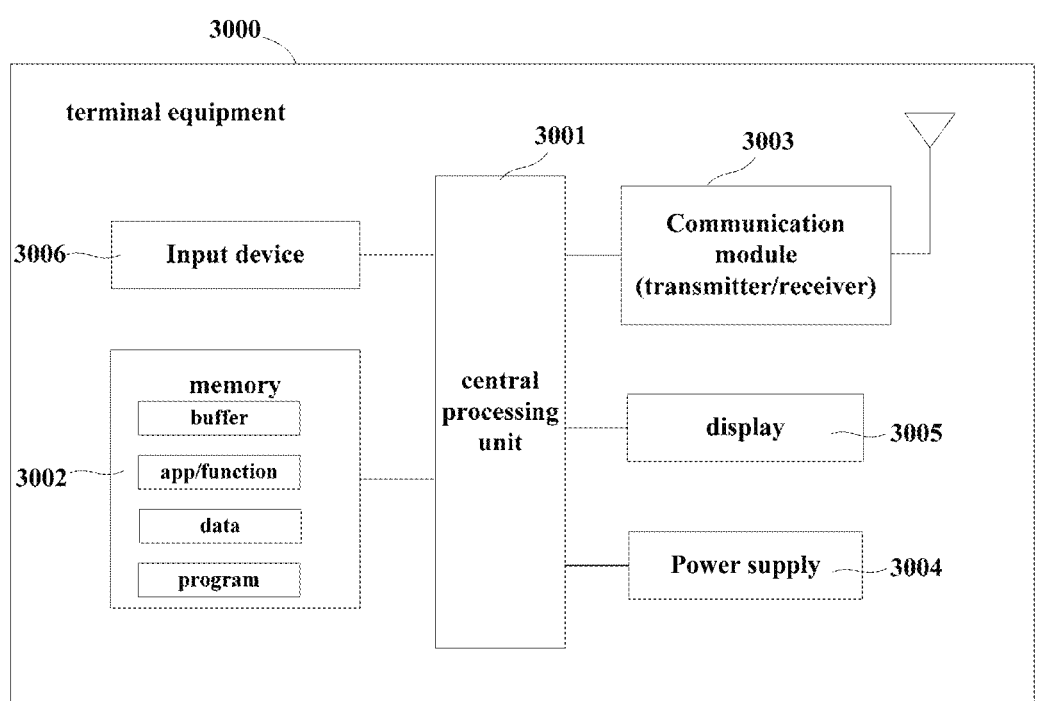
FIG. 30 is a schematic diagram of a structure of the terminal equipment of a fourteenth aspect of the embodiments of this disclosure.

FIG. 30 is a schematic diagram of a structure of the terminal equipment of the embodiment of this disclosure. As shown in FIG. 30, a terminal equipment 3000 may include a central processing unit (CPU) 3001 and a memory 3002, the memory 3002 being coupled to the central processing unit 3001. The memory 3002 may store various data, and furthermore, it may store a program for data processing, and execute the program under control of the central processing unit 3001, so as to indicate to the terminal equipment according to received signaling.

In one implementation, the functions of the apparatuses in the embodiment of the twelfth aspect may be integrated into the central processing unit 3001 of the terminal equipment 3000. The central processing unit 3001 may be configured to carry out the methods in the first, third, fifth, seven and ninth aspects.

For example, the central processing unit 3001 may be configured to perform control, such that the terminal equipment 3000 carries out the methods in the first, third, fifth, seven and ninth aspects.

Furthermore, reference may be made to the methods in the first, third, fifth, seven and ninth aspects for other configuration ways of the central processing unit 3001, which shall not be described herein any further.

In another implementation, the apparatuses in the embodiment of the twelfth aspect and the central processing unit 3001 may be configured separately; for example, the apparatuses in the embodiment of the twelfth aspect may be configured as a chip connected to the central processing unit 3001, such as units shown in FIG. 30, and the functions of the apparatuses in the embodiment of the twelfth aspect are executed under control of the central processing unit 3001. Furthermore, the terminal equipment 3000 may include an input unit 3006, a communication module 3003, a power supply 3004 and a display 3005.

Embodiment of a Fifteenth Aspect

The embodiment of the fifteenth aspect provides a network device.

Figure 31:
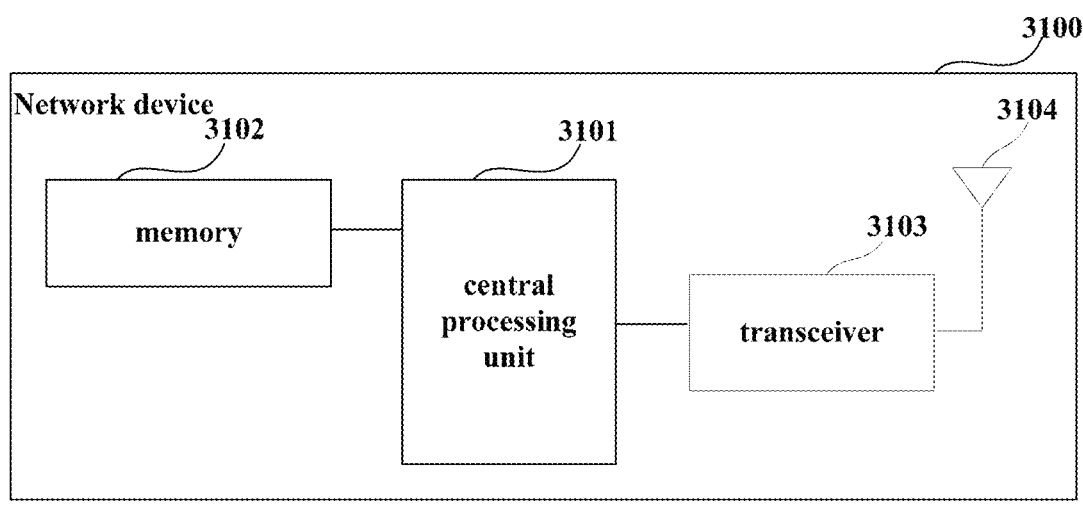
FIG. 31 is a schematic diagram of a structure of the network device of a fifteenth aspect of the embodiments of this disclosure.

FIG. 31 is a schematic diagram of a structure of the network device of the embodiment of this disclosure. As shown in FIG. 31, a network device 3100 may include a central processing unit (CPU) 3101 and a memory 3102, the memory 3102 being coupled to the central processing unit 3101. The memory 3102 may store various data, and furthermore, it may store a program for data processing, and execute the program under control of the central processing unit 3101.

In one implementation, the functions of the apparatuses in the embodiment of the thirteenth aspect may be integrated into the central processing unit 3101. The central processing unit 3101 may be configured to carry out the method described in the second, fourth, sixth, eighth and tenth aspects.

For example, the central processing unit 3101 may be configured to perform control, such that the network device 3100 carries out the method described in the second, fourth, sixth, eighth and tenth aspects.

Furthermore, reference may be made to the second, fourth, sixth, eighth and tenth aspects for other configuration methods of the central processing unit 3101, which shall not be described herein any further.

In another implementation, the apparatuses in the embodiment of the thirteenth aspect and the central processing unit 3101 may be configured separately; for example, the apparatuses in the embodiment of the thirteenth aspect may be configured as a chip connected to the central processing unit 3101, such as units shown in FIG. 31, and the functions of the apparatuses in the embodiment of the thirteenth aspect are executed under control of the central processing unit 3101.

Furthermore, as shown in FIG. 31, the network device 3100 may include a transceiver 3103, and an antenna 3104, etc. Functions of the above components are similar to those in the related art, and shall not be described herein any further. It should be noted that the network device 3100 does not necessarily include all the parts shown in FIG. 31. Furthermore, the network device 3100 may include parts not shown in FIG. 31, and the related art may be referred to.

Embodiment of a Sixteenth Aspect

The embodiment of the sixteenth aspect provides a communication system, at least including the apparatus of the embodiment of the twelfth aspect and the apparatus the embodiment of the thirteenth aspect. The contents of the embodiment of the twelfth aspect and the apparatus the embodiment of the thirteenth aspect are incorporated herein, and are not repeated here.

An embodiment of this disclosure provides a computer storage medium, including a computer readable program, which will cause a communication apparatus of V2X services or a terminal equipment or a network device to carry out the communication methods of V2X services in corresponding embodiments.

An embodiment of the present disclosure provides a computer readable program, which, when executed in a communication apparatus of V2X services or a terminal equipment or a network device, will cause the communication apparatus of V2X services or the terminal equipment or the network device to carry out the communication methods of V2X services in corresponding embodiments.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory.

The methods executed in the apparatuses described with reference to the embodiments of this disclosure may be directly embodied as hardware, software modules executed by a processor, or a combination thereof. For example, one or more functional block diagrams and/or one or more combinations of the functional block diagrams shown in FIGURES may either correspond to software modules of procedures of a computer program, or correspond to hardware modules. Such software modules may respectively correspond to the steps shown in FIGURES. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGURES may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

Following supplements are further provided in this disclosure.

1. A communication apparatus of V2X services, applicable to a terminal equipment, the apparatus including a first communication portion, wherein the first communication portion is configured to:
   detecting a radio link failure occurs in sidelink, and
   notifying that radio link failures occur in all sidelinks of the terminal equipment to a network device via a Sidelink UE Information message.

2. The apparatus according to supplement 1, wherein,
   in a case where radio link failures occur in all sidelinks of the terminal equipment,
   a sidelink transmission resource request list (sl-TxResourceReqList) field of the Sidelink UE Information message is absent in the Sidelink UE Information message.

3. The apparatus according to supplement 1, wherein,
   in a case where radio link failures occur in all sidelinks of the terminal equipment,
   a content of a sidelink transmission resource request list (sl-TxResourceReqList) field of the Sidelink UE Information message is blank.

4. The apparatus according to supplement 3, wherein,
   that a content of a sidelink transmission resource request list (sl-TxResourceReqList) field of the Sidelink UE Information message is blank refers to:
   that the number of elements in a sidelink transmission resource request list (sl-TxResourceReqList) of the Sidelink UE Information message is 0.

5. The apparatus according to supplement 1, wherein,
   in a case where radio link failures occur in all sidelinks of the terminal equipment,
   a content of an element in a sidelink transmission resource request list (sl-TxResourceReqList) field of the Sidelink UE Information message is blank.

6. The apparatus according to supplement 5, wherein,
   that a content of an element is blank refers to that the content of the element does not include a sidelink destination ID (sl-DestinationIdentity) or a sidelink cast type (sl-CastType) or quality of service (QoS) information.

7. The apparatus according to supplement 1, wherein,
   the Sidelink UE Information message includes indication information indicating that radio link failures occur in all sidelinks of the terminal equipment.

8. A communication apparatus of V2X services, applicable to a network device, the apparatus including a second communication portion, wherein the second communication portion is configured to,
   receive, via a Sidelink UE Information message, that radio link failures occur in all sidelinks of a terminal equipment notified by the terminal equipment.

9. The apparatus according to supplement 8, wherein,
   in a case where radio link failures occur in all sidelinks of the terminal equipment,
   a sidelink transmission resource request list (sl-TxResourceReqList) field of the Sidelink UE Information message is absent in the Sidelink UE Information message.

10. The apparatus according to supplement 8, wherein,
    in a case where radio link failures occur in all sidelinks of the terminal equipment,
    a content of a sidelink transmission resource request list (sl-TxResourceReqList) field of the Sidelink UE Information message is blank.

11. The apparatus according to supplement 10, wherein,
    that a content of a sidelink transmission resource request list (sl-TxResourceReqList) field of the Sidelink UE Information message is blank refers to:
    that the number of elements in a sidelink transmission resource request list (sl-TxResourceReqList) of the Sidelink UE Information message is 0.

12. The apparatus according to supplement 8, wherein,
    in a case where radio link failures occur in all sidelinks of the terminal equipment,
    a content of an element in a sidelink transmission resource request list (sl-TxResourceReqList) field of the Sidelink UE Information message is blank.

13. The apparatus according to supplement 12, wherein,
    that a content of an element is blank refers to that the content of the element does not include a sidelink destination ID (sl-DestinationIdentity) or a sidelink cast type (sl-CastType) or quality of service (QoS) information.

14. The apparatus according to supplement 8, wherein,
    the Sidelink UE Information message includes indication information indicating that radio link failures occur in all sidelinks of the terminal equipment.

15. A communication apparatus of V2X services, applicable to a terminal equipment, the apparatus including a third communication portion, wherein the third communication portion is configured to:
    transmit a Sidelink UE Information message to a network device, and
    determine a mapping relationship between destination IDs and destination indices in a sidelink buffer status report.

16. The apparatus according to supplement 15, wherein,
    the determining mapping relationship between destination IDs and destination indices in a sidelink buffer status report includes:
    mapping destination IDs excluding the destination ID where the radio link failure occurs with destination indices in a sidelink buffer status report sequentially according to an order of destination IDs in a previous Sidelink UE Information message, or
    mapping the destination IDs in a descending order or an ascending order and destination indices in a sidelink buffer status report sequentially, or
    when destination indices are identical to predetermined bits in destination IDs, mapping the destination IDs and the destination indices according to the destination indices and the predetermined bits in the destination IDs, or
    mapping destination IDs and destination indices sequentially after filling positions of destination IDs where radio link failures occur with a last destination ID.

17. The apparatus according to supplement 15, wherein,
    the determining mapping relationship between destination IDs and destination indices in a sidelink buffer status report includes:
    determining, by the terminal equipment, the mapping relationship according to a message used for configuring a mapping relationship between destination IDs and destination indices in a sidelink buffer status report and received from the network device.

18. The apparatus according to supplement 15, wherein, the third communication portion further,
transmits to the network device a message for reporting a mapping relationship between destination IDs and destination indices in a sidelink buffer status report.

19. A communication apparatus of V2X services, applicable to a network device, the apparatus including a fourth communication portion, wherein the fourth communication portion is configured to:
receive a Sidelink UE Information message; and
determine a mapping relationship between destination IDs and destination indices in a sidelink buffer status report.

20. The apparatus according to supplement 19, wherein, the determining mapping relationship between destination IDs and destination indices in a sidelink buffer status report includes:
mapping destination IDs excluding the destination ID where the radio link failure occurs with destination indices in a sidelink buffer status report sequentially according to an order of destination IDs in a previous Sidelink UE Information message, or
mapping the destination IDs in a descending order or an ascending order and destination indices in a sidelink buffer status report sequentially, or
when destination indices are identical to predetermined bits in destination IDs, mapping the destination IDs and the destination indices according to the destination indices and the predetermined bits in the destination IDs, or
mapping destination IDs and destination indices sequentially after filling positions of destination IDs where radio link failures occur with a last destination ID.

21. The apparatus according to supplement 15, wherein, the fourth communication portion further,
transmits to the terminal equipment a message for configuring a mapping relationship between destination IDs and destination indices in a sidelink buffer status report.

22. The apparatus according to supplement 19, wherein, the determining mapping relationship between destination IDs and destination indices in a sidelink buffer status report includes:
determining, by the network device, the mapping relationship according to a message for reporting a mapping relationship between destination IDs and destination indices in a sidelink buffer status report from the terminal equipment.

23. A communication apparatus of V2X services, applicable to a terminal equipment, the apparatus including a fifth communication portion, wherein the fifth communication portion is configured to:
in a case where radio link failures occur, transmit to a network device destination IDs where radio link failures occur, or transmit to a network device destination IDs other than destination IDs where radio link failures occur, according to a resource allocation mode.

24. The apparatus according to supplement 23, wherein, in a case where the resource allocation mode is that the network device allocates resources,
the fifth communication portion transmits to the network device the destination IDs other than destination IDs where radio link failures occur.

25. The apparatus according to supplement 23, wherein, in a case where the resource allocation mode is that the terminal equipment allocates resources,
the fifth communication portion transmits to the network device the destination IDs where radio link failures occur.

26. The apparatus according to any one of supplements 23-25, wherein,
the fifth communication portion further sets a resource allocation mode according to configuration information transmitted by the network device.

27. The apparatus according to any one of supplements 23-25, wherein,
the fifth communication portion further determines a resource allocation mode to which the destination IDs correspond.

28. The apparatus according to supplement 27, wherein, the fifth communication portion further reports to the network device the resource allocation mode to which the destination IDs correspond.

29. A communication apparatus of V2X services, applicable to a network device, the apparatus including a sixth communication portion, wherein the sixth communication portion is configured to:
in a case where radio link failures occur, receive destination IDs where radio link failures occur from a terminal equipment, or receive destination IDs other than destination IDs where radio link failures occur from a terminal equipment, according to a resource allocation mode to which the terminal equipment.

30. The apparatus according to supplement 29, wherein, in a case where the resource allocation mode is that the network device allocates resources,
the sixth communication portion receives the destination IDs other than destination IDs where radio link failures occur from the terminal equipment.

31. The apparatus according to supplement 29, wherein, in a case where the resource allocation mode is that the terminal equipment allocates resources,
the sixth communication portion receives the destination IDs where radio link failures occur from the terminal equipment.

32. The apparatus according to any one of supplements 29-31, wherein,
the sixth communication portion further transmits to the terminal equipment configuration information used for configuring a resource allocation mode.

33. The apparatus according to any one of supplements 29-31, wherein,
the sixth communication portion further receives information used for reporting a resource allocation mode to which the destination IDs correspond from the terminal equipment.

34. A communication apparatus of V2X services, applicable to a terminal equipment, the apparatus including a seventh communication portion, wherein the seventh communication portion is configured to:
receive a radio resource control (RRC) message transmitted by a network device, the radio resource control message being used for configuring a first index for destination IDs in a Sidelink UE Information message that has been transmitted by the terminal equipment, and transmit the Sidelink UE Information message containing the first index to which the destination IDs correspond.

35. A communication apparatus of V2X services, applicable to a terminal equipment, the apparatus including an eighth communication portion, wherein the eighth communication portion is configured to:

determine a correspondence between destination IDs and a first index, and transmit to the network device a Sidelink UE Information message containing the first index to which the destination IDs correspond.

36. The apparatus according to supplement 35, wherein the seventh communication portion or the eighth communication portion further, transmits a message notifying the correspondence to the network device.

37. The apparatus according to any one of supplements 34-36, wherein, destination indices to which respective destination IDs in a sidelink buffer status report (SL BSR) correspond are identical to or different from the first index.

38. A communication apparatus of V2X services, applicable to a network device, the apparatus including a ninth communication portion, wherein the ninth communication portion is configured to:

receive a Sidelink UE Information message transmitted by a terminal equipment, and transmit a sidelink-related configuration message to the terminal equipment, the configuration message containing a correspondence between destination IDs in the Sidelink UE Information message and a first index.

39. The apparatus according to supplement 38, wherein the ninth communication portion further, receives the Sidelink UE Information message containing the first index to which the destination IDs correspond from the terminal equipment.

40. A communication apparatus of V2X services, applicable to a network device, the apparatus including a tenth communication portion, wherein the tenth communication portion is configured to:

receive a Sidelink UE Information message transmitted by a terminal equipment, the Sidelink UE Information message containing a correspondence between destination IDs and a first index, and receive the Sidelink UE Information message containing the first index to which the destination IDs correspond from the terminal equipment.

41. The apparatus according to any one of supplements 38-40, wherein, destination indices to which respective destination IDs in a sidelink buffer status report (SL BSR) correspond are identical to or different from the first index.

42. A communication apparatus of V2X services, applicable to a terminal equipment, the apparatus including an eleventh communication portion, wherein the eleventh communication portion is configured to:

transmit a Sidelink UE Information message to a network device, wherein in a case where a cast type (CastType) and/or quality of service (QoS) to which destination IDs in the Sidelink UE Information message correspond is/are not changed, a field used for indicating the cast type to which the destination IDs correspond and/or a field used for indicating the quality of service to which the destination IDs correspond is(are) absent in the Sidelink UE Information message.

43. A communication apparatus of V2X services, applicable to a network device, the apparatus including a twelfth communication portion, wherein the twelfth communication portion is configured to:

receive a Sidelink UE Information message from a terminal equipment, wherein in a case where a cast type (CastType) and/or quality of service (QoS) to which destination IDs in the Sidelink UE Information message correspond is/are not changed, a field used for indicating the cast type to which the destination IDs correspond and/or a field used for indicating the quality of service to which the destination IDs correspond is(are) absent in the Sidelink UE Information message.

What is claimed is:

1. A communication apparatus of vehicle communication (V2X) services, applicable to a terminal equipment, the apparatus comprising a first communication portion, the first communication portion being configured to:

detect a radio link failure occurs in a sidelink; and notify to a network device via a sidelink user equipment (UE) information message that a radio link failure occurs in a sidelink of the terminal equipment, wherein in a case where radio link failures occur in all sidelinks of the terminal equipment, a sidelink transmission resource request list (sl-TxResourceReqList) field of the Sidelink UE Information message is absent in the Sidelink UF Information message.

2. The apparatus according to claim 1, wherein, the Sidelink UE Information message comprises indication information indicating that radio link failures occur in all sidelinks of the terminal equipment.

3. The apparatus according to claim 1, wherein, the sidelink UE information message contains a destination ID(s) of the sidelink where the radio link failure occurs.

4. The apparatus according to claim 1, wherein, the sidelink UE information message contains a destination ID(s) of a sidelink excluding the sidelink(s) where the radio link failure occurs.

5. A communication apparatus of vehicle communication (V2X) services, applicable to a network device, the apparatus comprising a second communication portion, the second communication portion being configured to:

receive, via a sidelink user equipment (UE) information message, that a radio link failure occurs in a sidelink of a terminal equipment notified by the terminal equipment, wherein in a case where radio link failures occur in all sidelinks of the terminal equipment, a sidelink transmission resource request list (sl-TxResourceReqList) field of the Sidelink UE Information message is absent in the Sidelink UE Information message.

6. The apparatus according to claim 5, wherein, the Sidelink UE Information message comprises indication information indicating that radio link failures occur in all sidelinks of the terminal equipment.

7. The apparatus according to claim 5, wherein, the sidelink UE information message contains a destination ID(s) of the sidelink where the radio link failure occurs.

8. The apparatus according to claim 5, wherein, the sidelink UE information message contains a destination ID(s) of a sidelink excluding the sidelink(s) where the radio link failure occurs.

9. A communication apparatus of vehicle communication (V2X) services, applicable to a terminal equipment, the apparatus comprising a fifth communication portion, the fifth communication portion being configured to:

in a case where radio link failures occur, transmit to a network device destination identities (IDs) where radio link failures occur, or transmit to a network device destination IDs other than destination IDs where radio link failures occur, according to a resource allocation mode.

10. The apparatus according to claim 9, wherein, in a case where the resource allocation mode is that the network device allocates resources, the fifth communication portion transmits to the network device the destination IDs other than destination IDs where radio link failures occur.

11. The apparatus according to claim 9, wherein, in a case where the resource allocation mode is that the terminal equipment allocates resources, the fifth communication portion transmits to the network device the destination IDs where radio link failures occur.

12. The apparatus according to claim 9, wherein, the fifth communication portion further sets the resource allocation mode according to configuration information transmitted by the network device.

13. The apparatus according to claim 9, wherein, the fifth communication portion further determines a resource allocation mode to which the destination IDs correspond.

14. The apparatus according to claim 13, wherein, the fifth communication portion further reports to the network device the resource allocation mode to which the destination IDs correspond.

* * * * *